(12) United States Patent
Kashioka

(10) Patent No.: US 8,994,979 B2
(45) Date of Patent: Mar. 31, 2015

(54) PRINT RELAY SYSTEM, IMAGE FORMING APPARATUS, SYSTEM CONTROL METHOD, AND PROGRAM

(75) Inventor: Atsushi Kashioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 610 days.

(21) Appl. No.: 13/319,005

(22) PCT Filed: Sep. 21, 2011

(86) PCT No.: PCT/JP2011/005306
§ 371 (c)(1),
(2), (4) Date: Nov. 4, 2011

(87) PCT Pub. No.: WO2012/066713
PCT Pub. Date: May 24, 2012

(65) Prior Publication Data
US 2012/0268769 A1   Oct. 25, 2012

(30) Foreign Application Priority Data
Nov. 15, 2010   (JP) ................................. 2010-255298

(51) Int. Cl.
*G06K 15/00* (2006.01)
*G06F 3/12* (2006.01)
*H04L 12/24* (2006.01)

(52) U.S. Cl.
CPC ............ *G06F 3/1204* (2013.01); *G06F 3/1229* (2013.01); *G06F 3/1239* (2013.01); *G06F 3/1287* (2013.01); *G06F 3/129* (2013.01); *H04L 41/0803* (2013.01); *G06F 3/1222* (2013.01); *G06F 3/1232* (2013.01)

USPC ......... 358/1.14; 358/1.15; 358/1.1; 358/1.13; 358/1.9; 358/1.16; 358/1.18; 358/401; 358/501; 709/201; 709/203; 709/213; 709/217; 726/3; 726/4; 726/21; 726/26

(58) Field of Classification Search
None
See application file for complete search history.

(56) References Cited

U.S. PATENT DOCUMENTS

| | | | |
|---|---|---|---|
| 7,484,211 B2 * | 1/2009 | Nakaoka et al. .............. | 718/100 |
| 7,605,932 B2 * | 10/2009 | Carney et al. ................ | 358/1.14 |
| 2003/0016385 A1 * | 1/2003 | Matsumoto et al. ......... | 358/1.15 |
| 2004/0201860 A1 * | 10/2004 | Nakaoka et al. .............. | 358/1.1 |
| 2006/0095500 A1 * | 5/2006 | Kato ............................ | 709/201 |
| 2008/0275945 A1 * | 11/2008 | Tanimoto ..................... | 709/203 |
| 2008/0282333 A1 | 11/2008 | Teramoto | |
| 2009/0216785 A1 | 8/2009 | Sato | |

(Continued)

FOREIGN PATENT DOCUMENTS

| | | |
|---|---|---|
| EP | 2204731 A2 | 7/2010 |
| JP | 2002-073304 A | 3/2002 |

(Continued)

*Primary Examiner* — Hilina K Demeter
(74) *Attorney, Agent, or Firm* — Canon USA Inc. IP Division

(57) ABSTRACT

A print relay system determines whether a printing function (capability) of an image forming apparatus corresponding to user authority setting has been registered in a printing service. Having determined that the printing function has been registered, the print relay system enables other users having the same authority to share the printing function (capability) of the image forming apparatus registered in the printing service.

8 Claims, 19 Drawing Sheets

(56) References Cited

U.S. PATENT DOCUMENTS

2009/0300744 A1 12/2009 Guo et al.
2009/0323110 A1* 12/2009 Shiimori et al. ............. 358/1.15
2010/0325541 A1* 12/2010 Imaizumi et al. ............. 715/708
2012/0013936 A1* 1/2012 Sawada ........................ 358/1.14
2013/0088619 A1* 4/2013 Sawano ........................ 348/239

FOREIGN PATENT DOCUMENTS

| | | |
|---|---|---|
| JP | 2005-149256 A | 6/2005 |
| JP | 2009-206697 A | 9/2009 |
| RU | 2325688 C2 | 5/2008 |
| RU | 2349953 C2 | 3/2009 |
| WO | 2009148746 A2 | 12/2009 |

* cited by examiner

Fig. 9B

```
<?xml version="1.0" encoding="UTF-8" ?>
<DeviceInformation>
  <Version>01.01</Version>
  <DeviceID>ABC0123456</DeviceID>
  <UserInfo>
    <UserName>UserB</UserName>
    <BaseRole>AdminilUser</BaseRole>
    ......
  </UserInfo>
  <DeviceCapabilities>
    <Capability Category="Print" Name="duplex">
      <Item>1-Side</Item>
      <Item>2-Side</Item>
    </Capability>
    <Capability Category="Print" Name="color_mode">
      <Item>mono</Item>
      <Item>color</Item>
    </Capability>
    <Capability Category="Print" Name="paper_size">
      <Item>B5</Item>
      <Item>A4</Item>
      <Item>A3</Item>
    </Capability>
    ......
    <DeviceCapabilities>
    ......
</DeviceInformation>
```

Fig. 9C

```
<?xml version="1.0" encoding="UTF-8" ?>
<DeviceInformation>
  <Version>01.01</Version>
  <DeviceID>ABC0123456</DeviceID>
  <UserInfo>
    <UserName>UserC</UserName>
    <BaseRole>GuestUser</BaseRole>
    ......
  </UserInfo>
  <DeviceCapabilities>
    <Capability Category="Print" Name="duplex">
      <Item>2-Side</Item>
    </Capability>
    <Capability Category="Print" Name="color_mode">
      <Item>mono</Item>
    </Capability>
    <Capability Category="Print" Name="paper_size">
      <Item>B5</Item>
      <Item>A4</Item>
    </Capability>
    ......
  <DeviceCapabilities>
  ......
</DeviceInformation>
```

Fig. 10A

| ID TO IDENTIFY IMAGE FORMING APPARATUS | INFORMATION TO IDENTIFY AUTHORITY | Service Printer ID |
|---|---|---|
| ABC0123456 | AdminUser | 2066904134356506708 |
| ABC0123456 | GeneralUser | 1234695692482390462 |
| DEF1357890 | GeneralUser | 4260548430266234523 |
| GHI2468012 | GuestUser | 5341397153498573493 |

Fig. 10B

| INFORMATION TO IDENTIFY AUTHORITY | REGISTRATION STATUS TO PRINTING SERVICE |
|---|---|
| AdminUser | True |
| GeneralUser | True |
| GuestUser | False |

Fig. 10C

| INFORMATION TO IDENTIFY AUTHORITY | REGISTRATION STATUS TO PRINTING SERVICE | USER LIST SHARED AMONG PRINTING SERVICES |
|---|---|---|
| AdminUser | True | UserB, ... |
| GeneralUser | True | UserA, UserD, UserE, ... |
| GuestUser | False | |

Fig. 11A

| USER NAME OF PRINTING SERVICES | USABLE IMAGE FORMING APPARATUS (Service Printer ID) LIST |
|---|---|
| P-ServiceManager | 1234695692482390462, |
| | 4260548430266234523, |
| | 2066904134356506708, |
| | 5341397153498573493 |
| P-UserA | 1234695692482390462, |
| | 4260548430266234523 |
| P-UserB | 2066904134356506708 |
| P-UserC | 5341397153498573493 |

Fig. 11B

| Service Printer ID | REGISTRATION INFORMATION OF IMAGE FORMING APPARATUS |
|---|---|
| 1234695692482390462 | file://xxxxxxxxxx/1234695692482390462.xml |
| 4260548430266234523 | file://yyyyyyyyyy/4260548430266234523.xml |
| 2066904134356506708 | file://zzzzzzzzzz/2066904134356506708.xml |

PRINT RELAY SYSTEM, IMAGE FORMING APPARATUS, SYSTEM CONTROL METHOD, AND PROGRAM

CROSS REFERENCE TO RELATED APPLICATIONS

This application is a National Stage filing of PCT Application No. PCT/JP2011/005306 filed on Sep. 21, 2011, which claims priority from Japanese Patent Application No. 2010-255298 filed on Nov. 15, 2010, the disclosures of each of which are hereby incorporated by reference herein in their entirety.

TECHNICAL FIELD

The present invention relates to a print relay system that manages information regarding an image forming apparatus, an image forming apparatus, a system control method, and a program.

BACKGROUND ART

In recent years, to reduce management/maintenance costs of a server or an application installed in a company, attention has been paid to a cloud computing system that enables use of various applications operating on a server computer through the Internet.

A main feature of the cloud computing system is that data conversion or data processing is executed in a dispersion manner by using many computing resources to simultaneously process requests from many clients. At present, there are appearing many vendors that compete with one another to provide a wide variety of services by mounting web services on a cloud computing environment to achieve the cloud computing.

As devices linked with various services provided by the cloud computing, a printer and a digital multifunction peripheral (collectively referred to as an image forming apparatus) used when a paper medium is scanned to be computerized, and electronic data is printed can be used. In many cases, the image forming apparatus is installed in a company (intranet). As compared with a case where there are an image forming apparatus and an application in the intranet, when there is an application in the Internet, to closely connect both, a method that takes security such as a fire wall into consideration is necessary.

Google (registered trademark) has developed a mechanism of data communication to provide services by linking with the image forming apparatus, and released an interface that enables the image forming apparatus to carry out data communication with a cloud computing environment provided by the Google. A user wishing to use the services must register information of the image forming apparatus in the cloud computing environment, namely, a service environment for providing the services.

In many cases, the image forming apparatus installed in the company is shared by a plurality of users. To link image forming apparatuses with the services provided by the cloud computing, users must register information of the same image forming apparatus in the service environment. However, when the information of the image forming apparatus that each user has registered in the service environment is updated, information of all the users who have registered the image forming apparatuses in the service environment must be updated. This generates many processes and communications.

As a conventional example to solve the problem, Japanese Patent Application Laid-Open No. 2002-073304 discusses a data processing method for storing setting registration files including a set of various print setting values separately for the users, and enabling selective displaying of registration information set by an administrator user. According to the data processing method, various print setting values set by the administrator user can be shared, and latest information regarding the image forming apparatus can be shared by transmitting a registration change message to all the users.

In recent years, from the standpoint of reducing total costs of ownership (TCO), to suppress a reduction of information leakage danger and an increase of costs, there has been proposed a method that can restrict various functions of the image forming apparatus for each group to which the user belongs. However, in the conventional example, various print setting values of the image forming apparatus registered in the service environment by an administrator to be shared are displayed as user's setting values even when it is unclear whether other users can also use the setting values. This is a first problem.

There is no method proposed to efficiently manage setting values registered in a printing service system. This is a second problem.

SUMMARY OF INVENTION

The present invention is directed to a print relay system that registers a function (capability) of an image forming apparatus usable by a user according to authority setting in a service environment, and shares the function with other users having the same authority. The print relay system provides a unit configured to automatically update a function set of the image forming apparatus registered in the service environment when there is a change in function or hardware configuration of the image forming apparatus, or user authority. The present invention is also directed to an apparatus or a system for efficiently managing setting values registered in the printing service system.

According to an aspect of the present invention, a print relay system capable of communicating with a printing service system managed by a vendor that releases specifications for data communication with an image forming apparatus, includes: a determination unit configured to determine, when a request for registration of the image forming apparatus used by a user is acquired in a registered state of a first account that is an account of the user using the image forming apparatus and a second account that is an account of the print relay system in the printing service system, whether the second account and information regarding a printing function of the image forming apparatus have been registered in association with each other in the printing service system; an instruction unit configured to instruct, when the determination unit determines that the second account and the information have not been registered in association with each other, registration of the second account and the information regarding the printing function in association with each other; and a requesting unit configured to request, after the instruction of the instruction unit or when the determination unit determines that the second account and the information have been registered in association with each other, sharing to the printing service system to enable even the user of the first account to use the information regarding the printing function registered in association with the second account.

According to an exemplary embodiment of the present invention, a print relay system that manages information registered in a service environment can be achieved.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 9B illustrates an example of registration information of the image forming apparatus generated by the printing control unit in the content printing system according to the first exemplary embodiment of the present invention.

FIG. 9C illustrates an example of registration information of the image forming apparatus generated by the printing control unit in the content printing system according to the first exemplary embodiment of the present invention.

FIG. 10A illustrates list information of image forming apparatuses registered in printing services managed by a printer management service in the content printing system according to the first exemplary embodiment of the present invention.

FIG. 10B illustrates list information of image forming apparatuses registered in printing services managed by the printing control unit in the content printing system according to the first exemplary embodiment of the present invention.

FIG. 10C illustrates list information of image forming apparatuses registered in printing services managed by the printing control unit in the content printing system according to the first exemplary embodiment of the present invention.

FIG. 11A illustrates a user registered in a printing service and information of an image forming apparatus usable by the user.

FIG. 11B illustrates information to link and manage registration information of an image forming apparatus corresponding to a Service Printer ID (SPID).

DESCRIPTION OF EMBODIMENTS

Various exemplary embodiments, features, and aspects of the invention will be described in detail below with reference to the drawings.

The present invention provides a print relay system disposed between an environment of a vendor that provides an interface for using printing services and an image forming apparatus.

A first exemplary embodiment of the present invention is described with reference to FIGS. 1 to 18.

Figure 1:
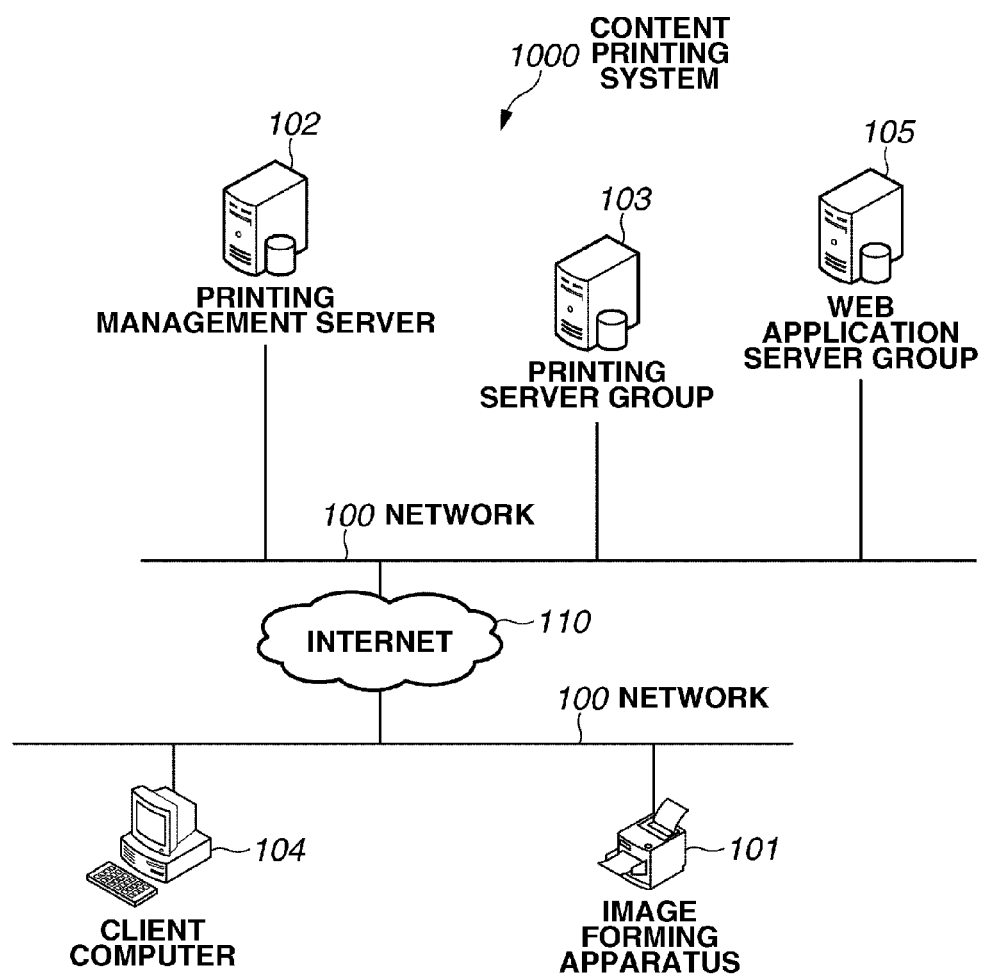
FIG. 1 is a conceptual diagram illustrating a content printing system according to a first exemplary embodiment of the present invention.

A configuration of a content printing system 1000 according to the first exemplary embodiment of the present invention is described. FIG. 1 illustrates the configuration of the content printing system 1000. The content printing system 1000 includes a client computer 104 and an image forming apparatus 101. The two apparatuses are located in a user environment, and connected to each other via a network 100. The network 100 is connected to the Internet 110. The apparatuses can accordingly communicate with each other.

The content printing system 1000 includes a web application server group 105 and a printing server group 103. The two server groups are provided from the same vendor, and connected to each other via the network 100. The network 100 is connected to the Internet 110.

In the first exemplary embodiment, two server groups are connected to each other via the network 100. However, they can be interconnected via the Internet 110. The content printing system 1000 includes a printing management server 102. The printing management server 102 is connected to the network 100 connected to the Internet 110. Each apparatus and each server group included in the content printing system 1000 can be interconnected via the Internet 110 to communicate data with each other. There is only one apparatus. However, a plurality of apparatuses can be included. There is a plurality of server groups. However, the number of server groups can be one.

Figure 2:
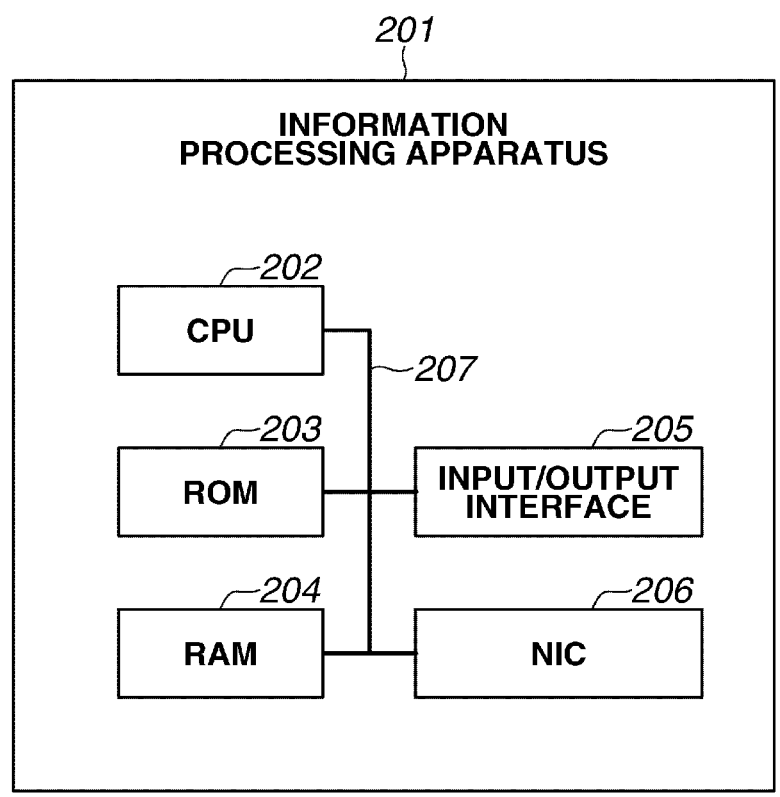
FIG. 2 illustrates a hardware configuration of each apparatus or each server group included in the content printing system according to the first exemplary embodiment of the present invention.

Next, a hardware configuration of each apparatus and each server group included in the content printing system 1000 is described. FIG. 2 illustrates a hardware configuration of each apparatus or each server group included in the content printing system 1000.

An information processing apparatus 201 includes each apparatus or each server group of the content printing apparatus 1000. A central processing unit (CU) 202 executes various programs to achieve various functions. A read only memory (ROM) 203 stores various programs. The CPU 202 loads the programs stored in the ROM 203 to a random access memory (RAM) 204 to execute them. The RAM 204 is also used as a temporary work storage area for the CPU 202.

An input/output interface 205 transmits data to a display (not illustrated) connected to each apparatus and each server group, and receives data from a pointing device (not illustrated). A network interface card (NIC) 206 connects each apparatus and each server group of the content printing system 1000 to the network 100. These units can transfer data via a bus 207. The image forming apparatus 101 includes a printing unit (not illustrated), which can transfer data with each unit via the bus 207. The printing unit can print raster images on a recording medium.

Figure 3:
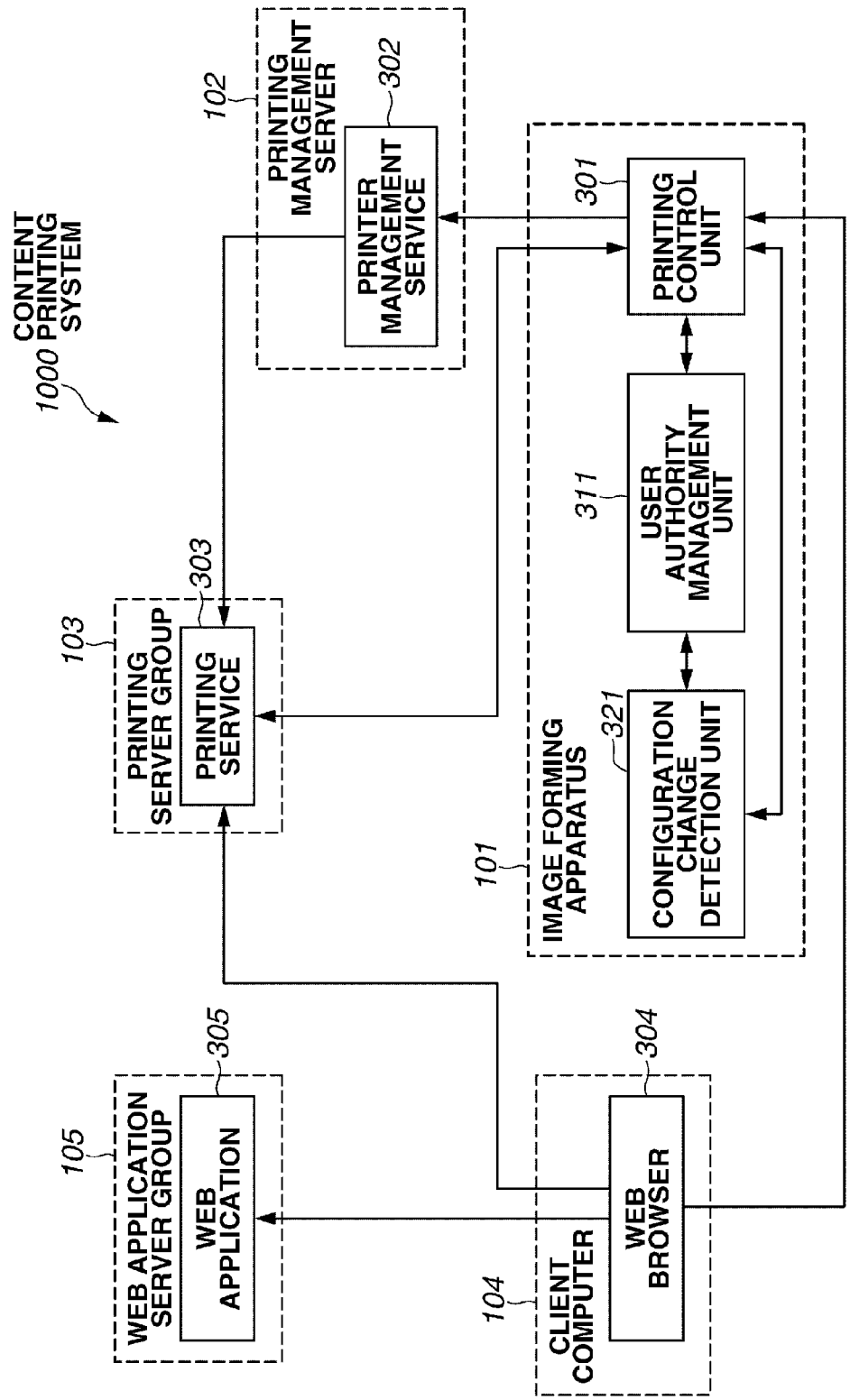
FIG. 3 illustrates an outline of an example of a software configuration included in the content printing system according to the first exemplary embodiment of the present invention.
Figure 4:
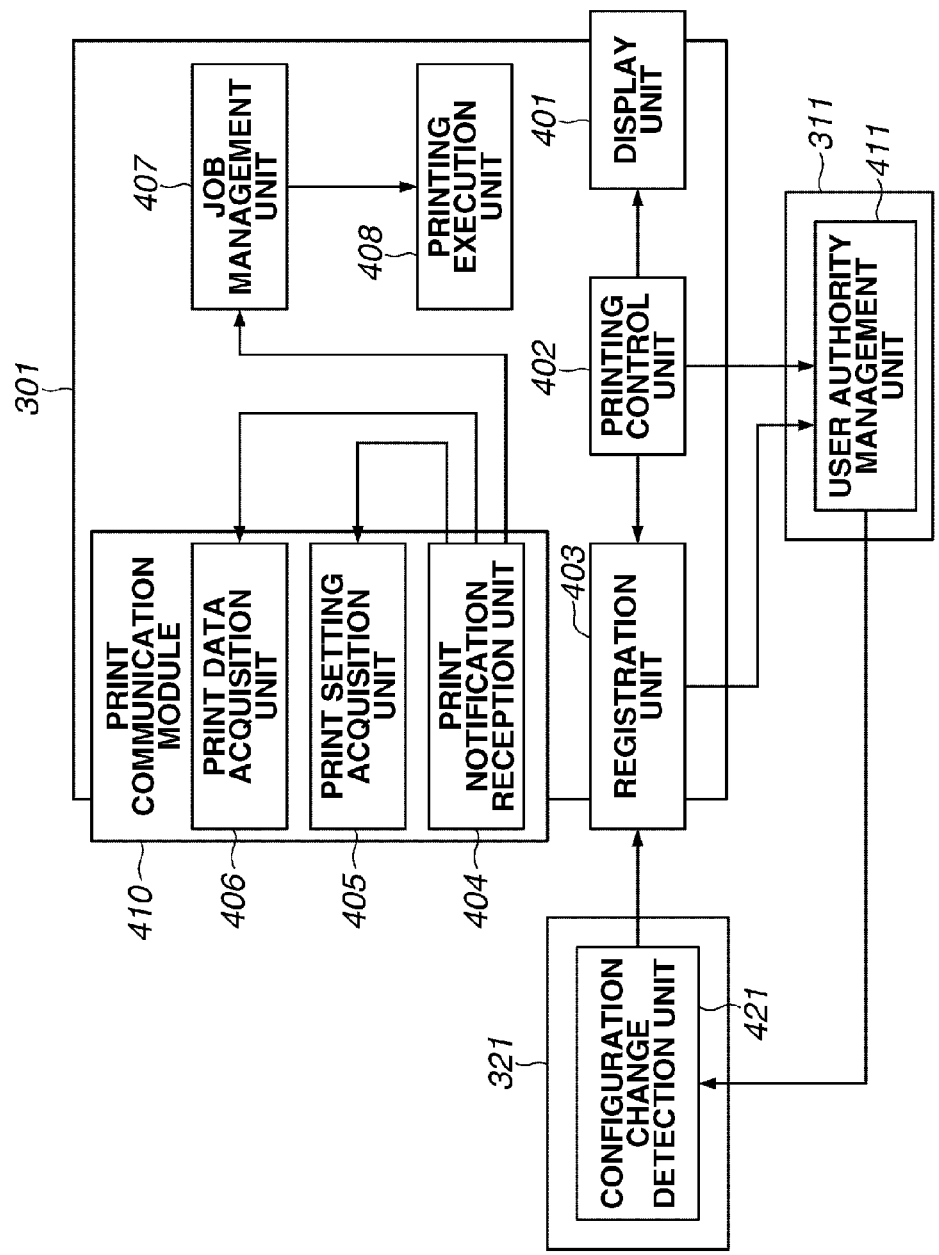
FIG. 4 illustrates a software configuration of an image forming apparatus included in the content printing system according to the first exemplary embodiment of the present invention.
Figure 5:
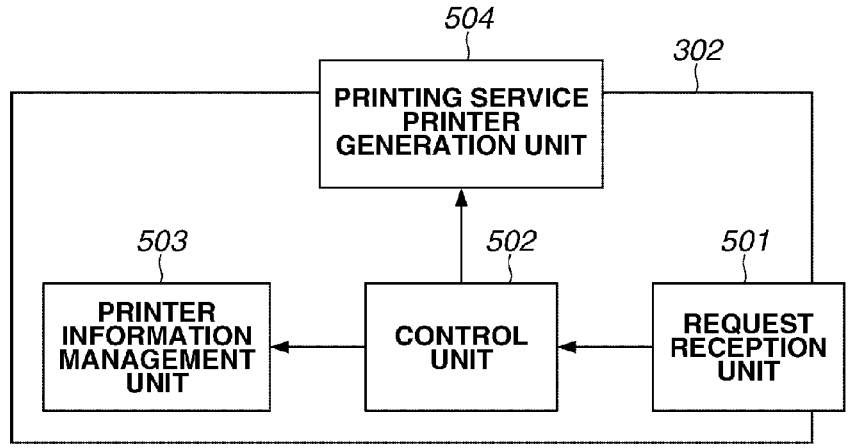
FIG. 5 illustrates a software configuration of a printing management server included in the content printing system according to the first exemplary embodiment of the present invention.
Figure 6:
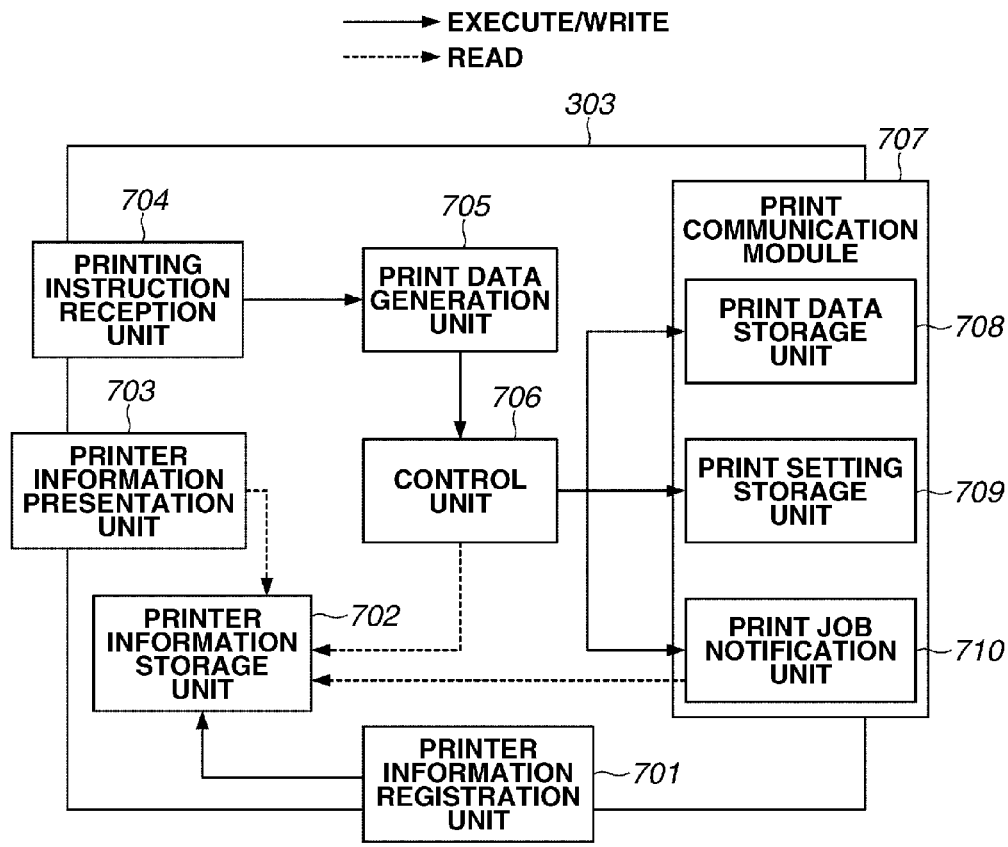
FIG. 6 illustrates a software configuration of a printing server included in the content printing system according to the first exemplary embodiment of the present invention.

Next, an outline of functions of each apparatus and each server group of the content printing system 1000 is described. FIG. 3 illustrates a software configuration of each apparatus and each server group included in the content printing system 1000. Programs for achieving functions of the software configuration illustrated in FIG. 3 are stored in the ROM 203 of each apparatus and each server group. The CPU 202 loads the programs to the RAM 204 to execute them, thereby achieving the functions. The printing management server 102 corresponds to the print relay system, and the printing server group 103 corresponds to the printing service system.

An outline of the functions of each apparatus and each server group is described. The functions are classified into the following two systems. The first includes functions classified as a registration system where information of the image forming apparatus 101 is transmitted to the printing management server 102, and the printing management server 102 registers the image forming apparatus 101 in the printing service 303. A printing control unit 301 of the image forming apparatus 101 transmits the information of the image forming apparatus 101 to the printing management server 102 based on a function of the image forming apparatus 101 usable by the user.

The second includes functions classified as an update system where when a certain change in configuration of the image forming apparatus 101 is detected, a changed content is transmitted to the printing management server 102, and the information of the image forming apparatus 101 registered in the printing service 303 is updated. A configuration change detection unit 321 of the image forming apparatus 101 detects a hardware configuration change of the image forming apparatus 101 or a user authority change, and transmits the changed content to the printing management server 102 via the printing control unit 301.

As described above, by using the information of the image forming apparatus 101 registered in the printing service 303, the user instructs the web application server group 105 to print generated and stored contents via a web browser 304 of the client computer 104. The web application server group 105 includes a web application 305.

The web application server group 105 virtualizes a plurality of servers to regard them as one server, and a function of the web application 305 is achieved by this one server. The web application server group 105 activates a plurality of virtual machines in the one server, and achieves the function of the web application 305 for each virtual machine.

The web application 305 provides document creation services. For example, when wishing to distribute conference materials of a company, the user uses the document creation services for creating the materials. When the client computer 104 uses the web application 305, there is no need to install the application in the client computer 104. The web browser 304 is used. The web application 305 transmits screen information to create the materials to the web browser 304. The web application 305 executes authentication based on user information containing user ID and password input by the user via the web browser 304, and transmits the screen information to create the materials according to a success of the authentication. The web browser 304 that has received the screen information displays a creation screen to create a document based on the screen information, and the user creates the materials to be distributed at the conference by using the creation screen. The web application 305 receives information of the materials created by the user using the creation screen, creates contents based on the received information, and stores the created contents in a storage device of the web application server group 105. The web application 305 provides not only the document creation services but also mail services and schedule services.

Figure 8A:
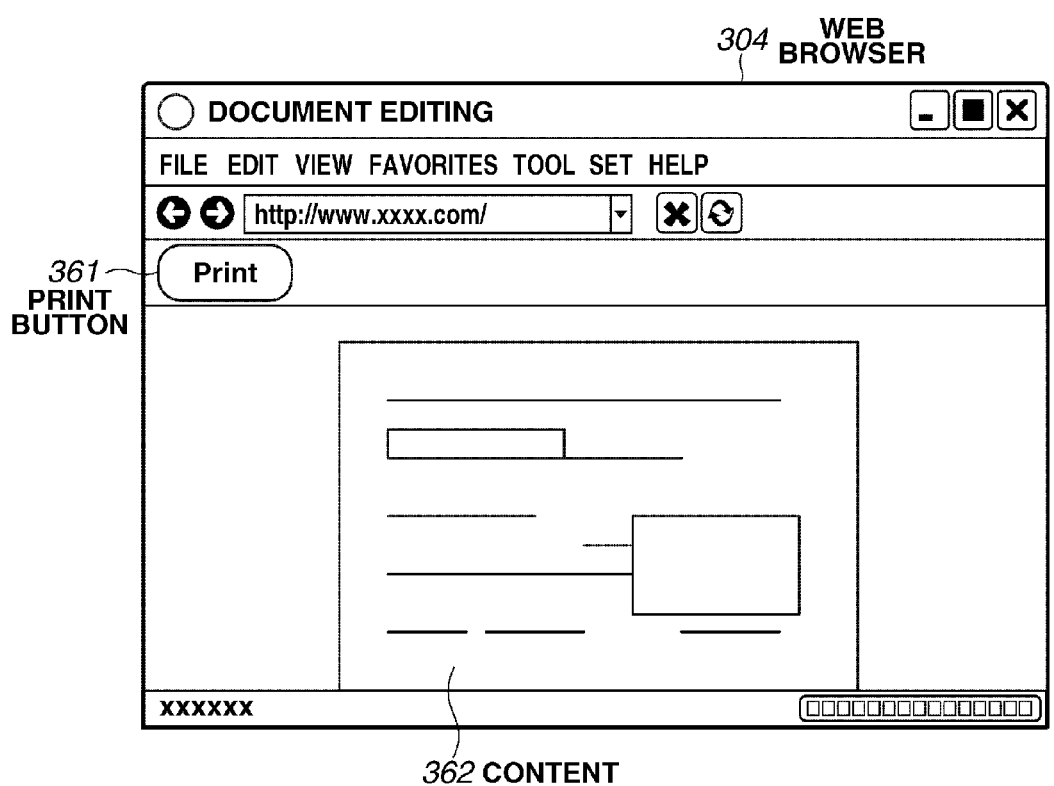
FIG. 8A illustrates an example of a screen of document creation services provide by a web application displayed on the web browser in the content printing system according to the first exemplary embodiment of the present invention.

FIG. 8A illustrates an example of a screen of the document creation services provided by the web application 305 displayed on the web browser 304. The user can instruct printing of a created content 362 by pressing a print button 361. The web application 305 receives information on the pressing of the print button, and transmits a command of access to the printing server group 103, namely, a redirection instruction, to the web browser 304. The redirection instruction includes a request of acquiring a list of image forming apparatuses corresponding to users using the web browser 304, content identification information to identify a content instructed to be printed by the user, and user information. The web application 305, which has received a content acquisition request from the printer server group 103, transmits a target content to the printing server group 103 based on content identification information received together with the acquisition request to identify the content.

Figure 8B:
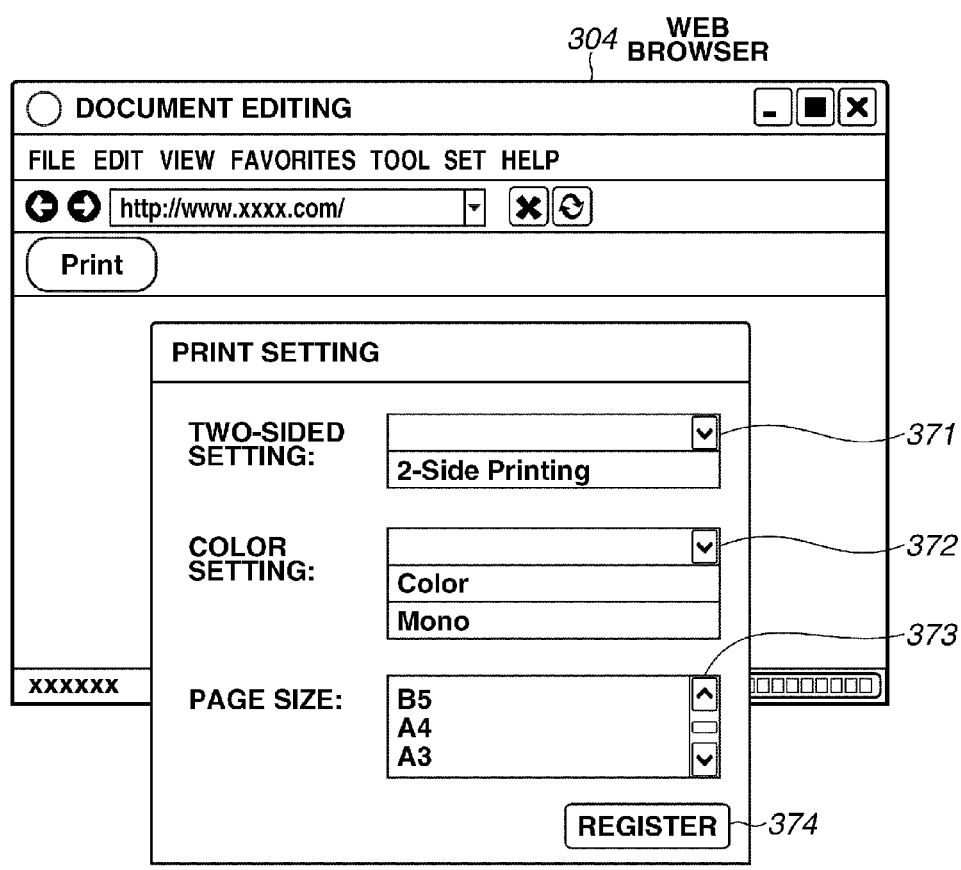
FIG. 8B illustrates a print setting screen corresponding to an image forming apparatus selected by the user to be displayed on the web browser in the content printing system according to the first exemplary embodiment of the present invention.

The web browser 304 acquires the list of image forming apparatuses printable by the user from the accessed printing server group 103 to display it. The web browser 304 acquires, from the printing server group 103, a print setting screen corresponding to an image forming apparatus selected from the list of image forming apparatuses by the user, and displays the print setting screen. FIG. 8B illustrates the print setting screen corresponding to the image forming apparatus selected by the user, which is displayed by the web browser 304. The web browser 304 transmits a print setting value set on the print setting screen by the user to the printing server group 103.

The print control unit 301 of the image forming apparatus 101 acquires notification information of a print job held by the printing service 303, and outputs it by a printing unit (not illustrated). Hereinafter, the functions of each apparatus and each server group are described in detail.

First, the function of the image forming apparatus 101 is described. The image forming apparatus 101 restricts, for the user, use of the image forming apparatus according to a user authority. The image forming apparatus 101 includes the printing control unit 301, a user authority management unit 311, and a configuration change detection unit 321, and achieves functions illustrated in FIG. 4.

Figure 7:
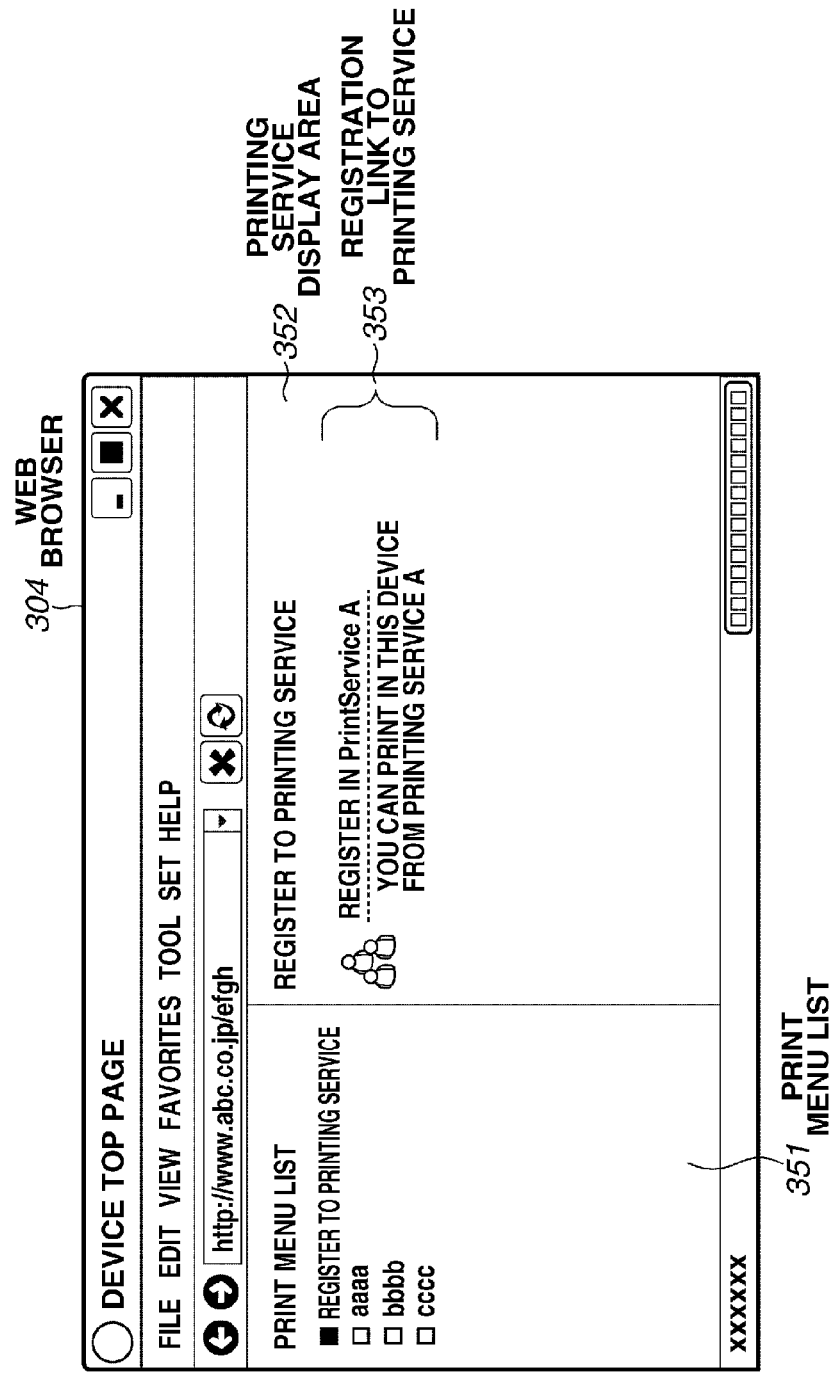
FIG. 7 illustrates an example of a user interface displayed on a web browser when a user accesses a printing control unit in the image forming apparatus in the content printing system according to the first exemplary embodiment of the present invention.

A display unit 401 displays various screens of the printing control unit 301 on an operation panel of the image forming apparatus 101 (not illustrated) or after access from the web browser 304 of the client computer 104. FIG. 7 illustrates an example of a user interface (UI) screen displayed when the user accesses the printing control unit 301 via the web browser 304. The UI screen includes a print menu list 351 for displaying a list of printing function/setting menus of the image forming apparatus 101, and a printing service display area 352 for displaying a list of printing services in which the image forming apparatus 101 can be registered. The printing service display area 352 includes a registration link 353 to the printing service when the user registers the image forming apparatus 101 in the printing service. There are no restrictions on a form, an area configuration, or control of the screen illustrated in FIG. 7. Any form can be employed as long as necessary functions can be achieved.

A printing control unit 402 controls each function in the printing control unit 301. A registration unit 403, when the user instructs a request of registration to the printing service 303 of the image forming apparatus 101 by using the UI screen of the printing control unit 301, generates registration information, and transmits it to a printer management service 302 in the printing management server 102. The registration unit 403 acquires a usable function of the image forming apparatus from a user authority management unit 411 according to a user authority, and reflects the function in the registration information to transmit it to the printer management service 302. The registration unit 403 receives a notification as to a hardware configuration change of the image forming apparatus 101 or a result of detecting a change of the user authority by the user authority management unit 411 from a configuration change detection unit 421, and transmits the changed content to the printer management service 302.

Figure 9A:
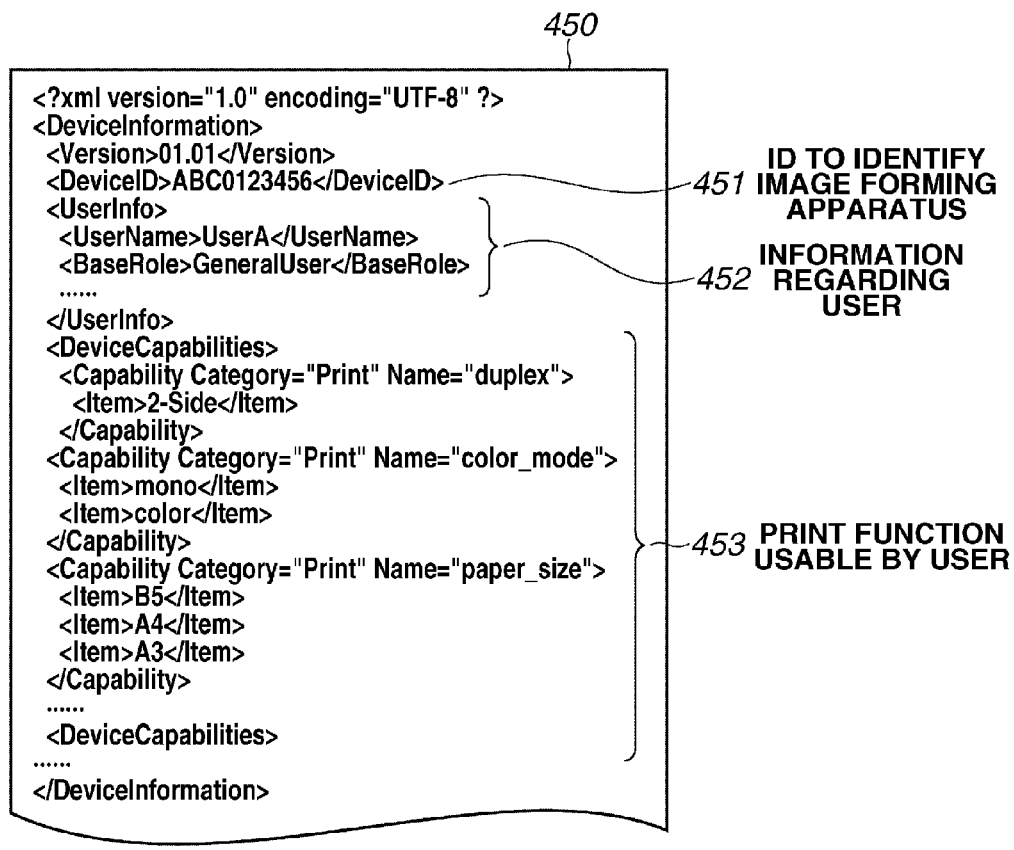
FIG. 9A illustrates an example of registration information of the image forming apparatus generated by the printing control unit in the content printing system according to the first exemplary embodiment of the present invention.

FIG. 9A illustrates an example of registration information 450 transmitted from the registration unit 403 to the printer management service 302, which is declared in a schema such as Extensible Markup Language (XML). In the registration information 450, ID 451 to identify an image forming apparatus, information 452 regarding a user, and a printing function 453 of an image forming apparatus usable by the user according to a user authority are declared. In the information 452, as user information, a user name and information to identify the user authority are declared. In the printing function 453, as a printing function usable by the user, information such as a color mode, two-sided printing, or a paper size regarding a printing function is declared. FIGS. 9B and 9C illustrate examples of registration information transmitted to the printer management service 302 by users different from each other in authority. For example, in FIG. 9B, a printing function usable by an administrator user (AdminUser) is declared. In FIG. 9C, a printing function usable by a guest user (GuestUser) is declared. Referring to FIGS. 9B and 9C, an example where printing functions usable by the administrator user and the guest user are different is described. The administrator user can use both monochrome and color printing functions while the guest user can use only a monochrome printing function. Thus, according to the authority of the user who has made the registration request, only information regarding necessary printing functions is transmitted to the printing management server.

The registration information 450 can contain other pieces of information. For example, security information to guarantee a content of the registration information 450 can be contained. The registration information 450 is not limited to the method of transmitting it to the printer management service 302 in the schema such as the XML. The information can be transmitted to an interface released by the printer management service 302.

The printing control unit 301 includes a print communication module 410. A print notification reception unit 404 of the print communication module 410 acquires notification information of a print job held by the printing service 303. The print notification reception unit 404 checks the acquired notification information, and notifies a print setting acquisition unit 405 and a print data acquisition unit 406 of each information. The print setting acquisition unit 405 acquires print setting from the printing service 303 based on a storage place of the notified print setting. The print data acquisition unit 406 acquires print data from the printing service 303 based on a storage place of the notified print data. The acquired print setting and print data are transmitted to a job management unit 407 via the print notification reception unit 404. The print management unit 407 acquires information of the print data and the print setting, and instructs a printing execution unit 408 to execute printing. The printing execution unit 408, which has received the instruction, generates a raster image based on the print setting and the print data, and instructs the printing unit to print the generated raster image.

Next, a function of the printing management server 102 is described in detail. The printing management server 102 includes the printer management service 302 to achieve each function illustrated in FIG. 5.

A request reception unit 501 receives an instruction (registration request) and the registration information (information regarding printing function) transmitted from the registration unit 403 of the printing control unit 301 according to a user instruction. A control unit 502 acquires and interprets the instruction and the registration information received by the request reception unit 501, and then instructs a printing service printer generation unit 504 to register the image forming apparatus 101 in the printing service 303 or update registered information. In this case, the control unit 502 notifies the printing service printer generation unit 504 of user information.

The printing service printer generation unit 504 executes, to access the printing server group 103, authentication by using user information unique to the printer management service 302. When the authentication is successful, according to an instruction from the control unit 502, the printing service printer generation unit 504 registers the image forming apparatus 110 or updates registration information of the registered image forming apparatus. When the instruction from the control unit 502 is registration, the printing service printer generation unit 504 transmits the received registration information of the image forming apparatus 101 and a printer name to the printing service 303 to register them therein. The printing service printer generation unit 504 receives, as a response, an SPID as information to identify the image forming apparatus 101 registered in the printing service 303. Then, the printing service printer generation unit 504 requests, by using the received SPID, the printing service 303 to enable sharing of the registered image forming apparatus 101 based on the user information received from the printing service control unit 502. When the instruction from the control unit 502 is updating, the printing service printer generation unit 504 requests, by using the SPID, the printing service 303 to update the registration information of the registered image forming apparatus 101. The printing service printer generation unit 504 can directly register information regarding a printing function, which is the received registration information, in the printing service 303, or information of another format generated based on the information regarding the printing function according to the printing service 303.

The control unit 502 acquires the SPID from the printing service printer generation unit 504, and instructs a printing service information management unit 503 to store the information of the image forming apparatus 101 stored in the printing service 303. The printing service information management unit 503 stores an ID to identify the image forming apparatus, information to identify authority, and the SPID in association with each other as illustrated in FIG. 10A.

Next, a function of the printing server group 103 is described in detail. The printing server group 103 includes the printing service 303 to achieve each function illustrated in FIG. 6. In the printing server group 103, a plurality of servers is virtualized to be regarded as one server, and the one virtualized server achieves the function of the printing service 303. The printing server group 103 activates a plurality of virtual machines in the one virtualized server, and achieves the function of the printing service 303 for each virtual machine. The printing service 303 illustrated in FIG. 3 is one thereof. The printing server group 103 corresponds to a printing service system managed by a vendor that releases specifications for data communication with the image forming apparatus.

A printer information registration unit 701 receives a request for registration of the image forming apparatus 101 or an information updating request of the image forming apparatus 101 transmitted from the printer management service 302. In the case of newly registering the image forming apparatus 101, the printer information registration unit 701 generates an SPID. The printer information registration unit 701 registers the SPID together with the registration information of the image forming apparatus 101 received from the printer management service 302 and linked with the user in a printer information storage unit 702. In the case of updating the information of the image forming apparatus 101, the information of the image forming apparatus 101 stored in the printer information registration unit 701 is updated. The printer information registration unit 701 transmits the SPID generated during the registration in the image forming apparatus 101 to the printer management service 302.

FIG. 11A illustrates an example of a user registered in the printing service 303 managed by the printer information storage unit 702 and information of an image forming apparatus usable by the user. For each user, a list of SPIDs to identify usable image forming apparatuses is stored and managed. FIG. 11B illustrates an example of information to link and manage registration information of an image forming apparatus corresponding to the generated SPID. The registration information of the image forming apparatus is stored as a file, and a path of the file storing the registration information corresponding to the SPID is managed. In the examples illustrated in FIGS. 11A and 11B, other information can be managed together or managed in the above-mentioned information/format.

As illustrated in FIG. 11A, in the printer information storage unit 702, SPID "12345692482390462" registered by user "P-Service Manager" is shared with user "P-User A". "42605484302662234523" is also shared. In FIG. 11A, information of the same image forming apparatus is not registered for each user, but managed by sharing the information of P-Service Manager among the users. In other words, registration information of the image forming apparatus registered by the user "P-Service Manager" can be shared by the user "P-User A". As a result, print setting displayed on a print setting screen corresponding to the image forming apparatus, an example of which is illustrated in FIG. 8B, is similarly displayed. Each user does not register the registration information of the same image forming apparatus, and hence only the user "P-Service Manager" registered first during updating of the image forming apparatus described below needs to update the registration information of the registered image forming apparatus. Various pieces of user information such as the user "P-Service Manager" registered in the printing service 303 are referred to as accounts. An account of a user who uses the image forming apparatus 101 and has made a registration request is a first account, and an account when the print relay server registers information regarding a printing function is a second account. As illustrated in FIG. 11A, an account of each user and an SPID corresponding to the information regarding the printing function are registered in association with each other.

A printer information presentation unit 703 transmits a list to the web browser 304 in response to a list acquisition request received from the web browser 304. The printer information presentation unit 703 generates a list of image forming apparatuses usable by the user, which have been stored in the printer information storage unit 702. The printer information presentation unit 703 receives an SPID of a symbol corresponding to an image forming apparatus selected from the list by the user. The symbol is an icon of the image forming apparatus displayed in the list. The printer information presentation unit 703 identifies registration information of the image forming apparatus 101 stored in the printer information storage unit 702 based on the received SPID, generates a print setting screen, and transmits the generated print setting screen to the web browser 304. The printer information storage unit 702 generates the print setting screen illustrated in FIG. 8B based on the registration information of the image forming apparatus 101. As illustrated in FIG. 8B, the printer information storage unit 702 generates the print setting screen so that the printing service 303 can select only print setting to be processed.

A printing instruction reception unit 704 receives the print setting set via the print setting screen and the SPID from the web browser 304. The printing instruction reception unit 704 receives content identification information to identify a content instructed to be printed by the user at the time of access from the web browser 304 based on a redirection instruction.

A print data generation unit 705 receives the content identification information from the printing instruction reception unit 704, and acquires a content to be printed from the web application 305 based on the received content identification information. The print data generation unit 705 receives the print setting input by the user and the SPID corresponding to the image forming apparatus selected by the user from the printing instruction reception unit 704. The print data generation unit 705 converts the content into print data based on the content and the print setting received from the web application 305.

A control unit 706 acquires the print data, the print setting, and the SPID from the print data generation unit 705. A print communication module 707, which can communicate with the print communication module 410 included in the printing control unit 301 of the image forming apparatus 101, is an interface for data communication therewith.

The print communication module 707 includes a print data storage unit 708, a print setting information storage unit 709, and a print job notification unit 709. The print data storage unit 708 receives the print data from the control unit 706 to store it. The print setting information storage unit 709 receives the print setting from the control unit 706 to store it. The print data storage unit 708 and the print setting information storage unit 709 receive storage instructions from the control unit 706 to store data. After reception of messages of storage ends from the print data storage unit 708 and the print setting information storage unit 709, the control unit 706 instructs a print job notification unit 710 to transmit notification information. The print job notification unit 710 can transmit the notification information to the print communication module 410 of the image forming apparatus 101 or acquire the notification information from the print communication module 410.

Hereinafter, referring to FIGS. 1 to 14, steps of a registration process of the image forming apparatus 101 of the content printing system according to the first exemplary embodiment of the present invention in the printing service 303 are specifically described.

Figure 12:
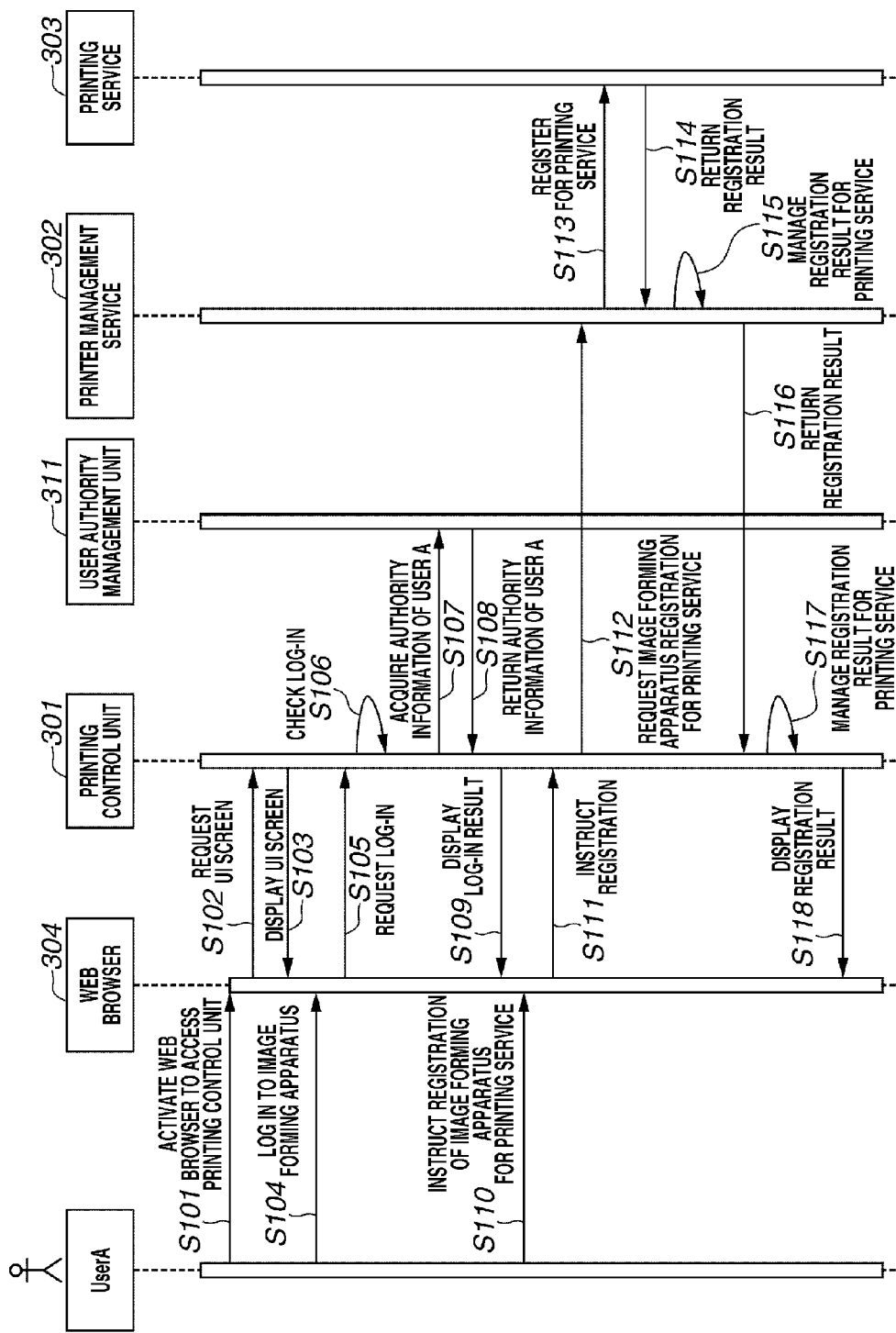
FIG. 12 is a sequence diagram illustrating an outline of a flow of registering an image forming apparatus in the printing service in the content printing system according to the first exemplary embodiment of the present invention.

The User A accesses the printing control unit 301 included in the image forming apparatus 101 according to the first exemplary embodiment of the present invention via the web browser 304, and registers the image forming apparatus in the printing service 303 in association with the printer management service 302. FIG. 12 is a sequence diagram illustrating an outline of a registration flow of the image forming apparatus 101 in the printing service 303. The flow is described with reference to FIGS. 3 to 12.

In step S101, the User A activates the web browser 304, and gives access instruction to the printing control unit 301 by inputting a URL. In step S102, the web browser 304, which has received the instruction from the User A in step S102, transmits a request for a UI screen to the printing control unit 301.

In step S103, after reception of the UI screen request from the web browser 304 in step S102, the display unit 401 of the printing control unit 301 returns a top page (not illustrated) of the printing control unit 301 to display it on the web browser 304. In this case, when it is determined that the User A has not logged into the image forming apparatus 101, the display unit 401 returns the top page having control to input log-in information to the web browser 304 to display it. Any unit can be used for determining whether the user has logged into the image forming apparatus 101.

In step S104, the User A inputs the log-in information to the top page having the control to input the log-in information displayed on the web browser 304 in step S103. In step S105, the web browser 304 instructed by the User A in step S104 transmits the log-in information of the User A to the printing control unit 301 to make a log-in request to the image forming apparatus.

In step S106, the printing control unit 402, which has received the log-in request in step S105, determines whether the user can log into the image forming apparatus 101 by using the received log-in information. In step S107, after confirmation of a log-in success of the User A in step S106, the printing control unit 402 requests the user authority management unit 411 to acquire authority information of the User A.

In step S108, the user authority management unit 411, which has received the acquisition instruction of the authority information of the User A in step S107, returns the authority information of the User A to the printing control unit 402. The authority information of the User A is the information 452 regarding the user or the information 453 regarding the printing function of the image forming apparatus 101 usable by the user according to the user authority. As the authority information of the User A, information other than the information regarding the user and the information regarding the printing function usable by the user can be included.

In step S109, as a result of the determination as to the log-in success of the User A and the acquisition of the authority information of the User A in steps S106 and S108, the display unit 401 generates a UI screen of the printing control unit 301 to display it on the web browser 304. As described above, FIG. 7 illustrates the example of the UI screen when the printing control unit 301 is accessed via the web browser 304. Other screens can be displayed. In such a case, a button for displaying the screen illustrated in FIG. 7 is displayed on the other screen.

In step S110, the User A operates the UI screen of the printing control unit 301 displayed on the web browser 304 in step S109 to instruct the printing service 303 to register the image forming apparatus 101. In step S111, the web browser 304 receives the instruction given by the User A in step S110. A registration request to the printing service 303 is transmitted to the printing control unit 301 together with the registration information containing the information regarding the printing function of the image forming apparatus 101 usable according to the authority of the User A.

In step S112, the printing control unit 301, which has received the registration request to the printing service 303 in step S111, requests the printer management service 302 to register the image forming apparatus 101 in the printing service 303. This step is described in detail below with reference to FIG. 13. In step S113, the printer management service 302, which has received the request from the printing control unit 301 in step S112, reflects the printing function usable according to the authority of the User A in the information of the image forming apparatus 101, and registers the reflected information. This step is described in detail below with reference to FIG. 14.

In step S114, a result of registering the information of the image forming apparatus 101 in the printing service 303 in step S113 is received. Then, in step S115, the printer management service 302 manages the registration result of the image forming apparatus 101. More specifically, the control unit 502 in the printer management service 302 acquires the SPID that is information received from the printing service 303 to identify the image forming apparatus in the printing service 303. The control unit 502 then instructs the printing service information management unit 503 to store the information of the image forming apparatus 101 registered in the printing service 303. FIG. 10A illustrates an example of the information of the image forming apparatus stored in the printing service information management unit 503. An ID to identify the image forming apparatus, information to identify authority, and an SPID are stored in association with each other.

In step S116, the control unit 502 returns the registration result of the image forming apparatus 101 in the printing service 303 received in step S114 to the printing control unit 301. In step S117, after confirmation of the registration success of the image forming apparatus 101 in the printing service 303 in step S116, the printing control unit 402 stores the storage of the image forming apparatus 101 in the printing service 303 to manage it. Specifically, as illustrated in FIG. 10B, a character string to identify the user authority and whether the image forming apparatus 101 having the printing function usable according to the user authority has been registered in the printing service 303 are linked with each other to be managed. In step S118, having received the registration result of the image forming apparatus 101 in the printing service 301 in step S117, the display unit 401 generates a UI screen to display it on the web browser 304.

Figure 13:
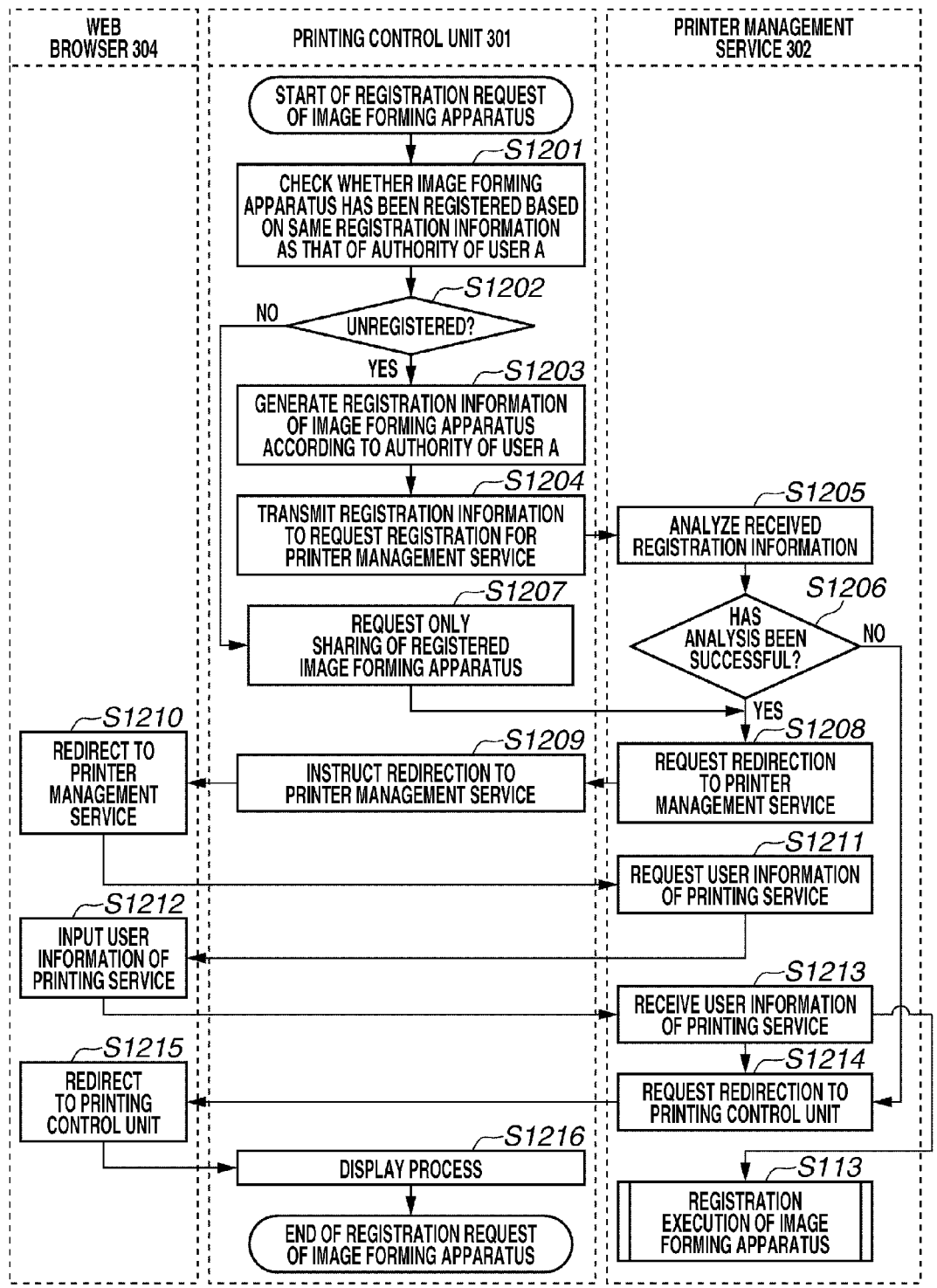
FIG. 13 is a flowchart illustrating a flow of registration requesting of the image forming apparatus to the printer management service in the content printing system according to the first exemplary embodiment of the present invention.

In step S112, the printing control unit 301 requests the printer management service 302 to register the image forming apparatus 101 in the printing service 303. FIG. 13 is a flowchart illustrating a flow of requesting the printer management service to register the image forming apparatus. The flow is described in detail below with reference to FIGS. 3 to 13.

In step S1201, the printing control unit 402 extracts the information to identify the authority from the authority information of the User A acquired in step S108. An example is a character string such as "AdminUser" or "GeneralUser" to identify the authority of the User A, more specifically, a character string to express an authority group to which the User A belongs. The registration unit 403 then checks whether the image forming apparatus 101 having the printing function usable according to the authority of the User A has been registered in the printing service 303. As illustrated in FIG. 10B, the registration unit 403 links and manages the character string to identify the user authority and whether the image forming apparatus 101 having the printing function usable according to the user authority has been registered in the printing service 303. Based on the management result of the image forming apparatus 101 having the printing function usable according to the authority of the User A, the registration unit 403 checks whether the image forming apparatus 101 having the printing function usable according to the authority of the User A has been registered in the printing service 303.

In step S1202, the control unit 403 checks a result of the determination in step S1201 as to whether the information of the image forming apparatus 101 having the printing function usable according to the authority of the User A has been registered in the printing service. In step S1203, the printing control unit 402, which has confirmed that the information has not been registered in step S1202, registers the information of the image forming apparatus 101 usable according to the authority of the User A in the printing service 303. Thus, registration information containing information regarding a printing function is generated. As described above, FIG. 9A illustrates an example of the registration information. User information to access the printer management service 302 can be input from the UI screen displayed by the display unit 401 of the printing control unit 301, or linked with the user to be stored in the printing control unit 301.

In step S1204, the registration unit 403 transmits the registration information generated in step S1203 to the printer management service 302, and requests registration of the image forming apparatus 101 having the printing function usable according to the authority of the User A in the printing service 303.

In step S1205, when the request reception unit 501 of the printer management service 302 receives the registration information transmitted in step S1204, the control unit 502 analyzes a content of the registration information. More specifically, the control unit 502 checks whether all pieces of information necessary for registering the image forming apparatus 101 in the printing service 303 are included. The pieces of necessary information include at least the information regarding the printing function and information of an account for making a registration request.

In step S1206, the control unit 502 confirms that the registration information is normal as a result of the analysis in step S1205. Then, the processing proceeds to step S1208. In step S1207, when it is determined that the image forming apparatus 101 has been registered (YES in step S1202), the printing control unit 402 executes next processing. This processing is for requesting the printer management service 302 to share the image forming apparatus 101 registered in the User A in the printing service 303 via the registration unit 403. In step S1208, the control unit 502 of the printer management service 302 requests, to acquire user information to access the printing service 303, the printing control software 301 for redirection to the printer management service 302.

In step S1210, the printing control unit 402, which has received the redirection instruction in step S1209, instructs the web browser 304 for redirection to the printer management service 302. In step S1211, the web browser 304 that has received the instruction makes redirection to the printer management service 302. When the web browser 304 accesses the printer management information 302 in redirection in step S1211, the control unit 502 executes next processing. This processing is for displaying the UI screen (not illustrated) to input user information necessary for accessing the printing service 303 on the web browser 304.

In step S1212, the User A inputs the user information used for accessing the printing service 303 displayed on the web browser 304. In step S1213, the control unit 502 of the printer management service 302 receives the user information input by the User A in step S1212. The control unit 502 ends preprocessing for registering the image forming apparatus 101 in the printing service 303, and executes registration of the image forming apparatus of step S113.

Concurrently with the registration of the image forming apparatus, in step S1214, when the analysis of the registration information is unsuccessful (NO in step S1206), the control unit 502 ends the processing up to step S1213, and requests the printing control unit 301 for redirection. In step S1215, the web browser 304, which has received the redirection instruction in step S1214, makes redirection to the printing control unit 301. In step S1216, when the web browser 304 accesses the printing control unit 301 in redirection executed in step S1215, next processing is executed. The display unit 401 displays the UI screen to display a process of registering the image forming apparatus 101 in the printing service 303 on the web browser 304.

Figure 14:
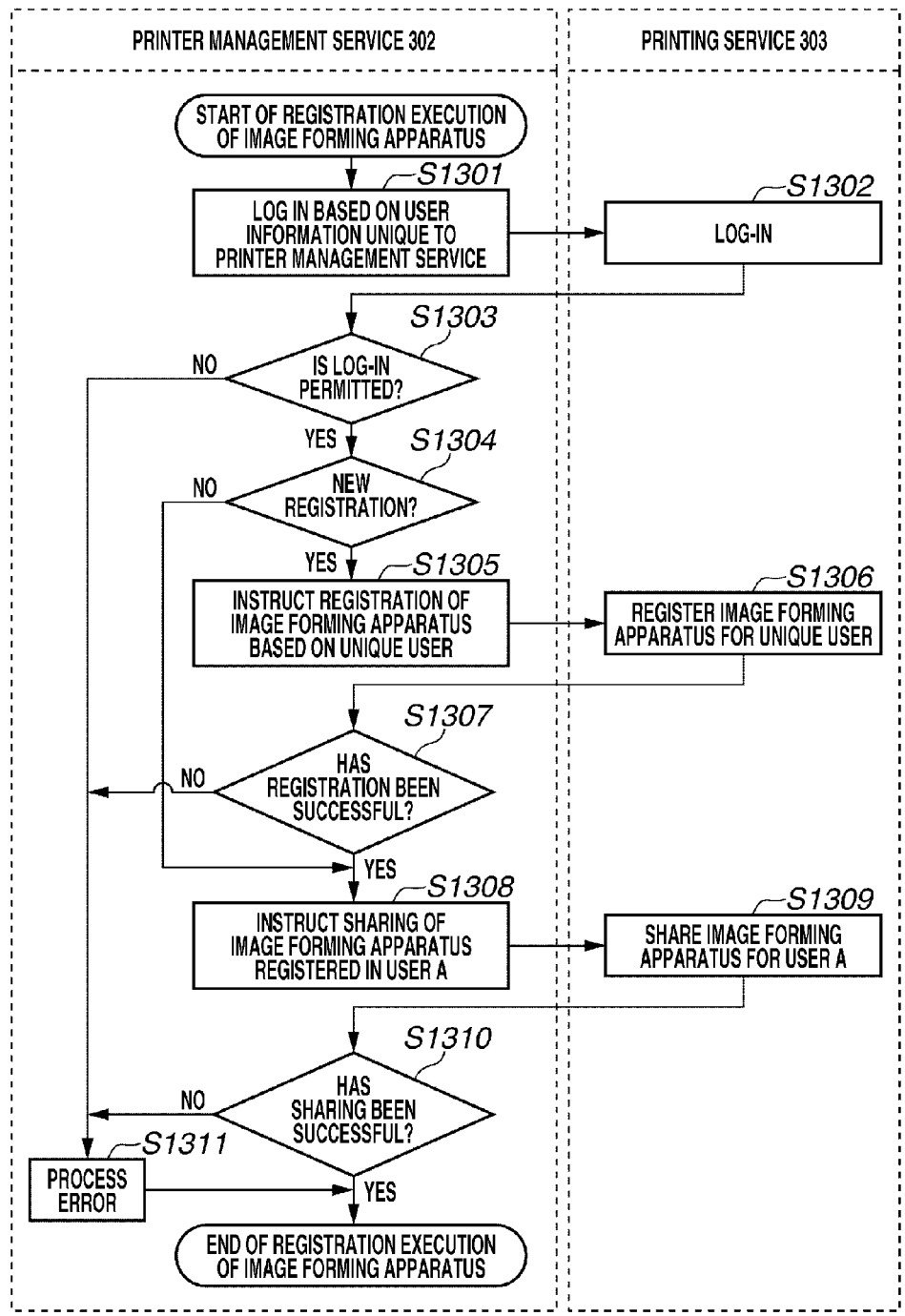
FIG. 14 is a flowchart illustrating a flow of registration execution of the image forming apparatus in the printing service in the content printing system according to the first exemplary embodiment of the present invention.

In step S113 and step S114, the printer management service 302, which has been requested from the printing control unit 301 in step S112, registers the information of the image forming apparatus 101 reflecting the printing function usable according to the authority of the User A in the printing service 303. FIG. 14 is a flowchart illustrating a registration flow of the image forming apparatus in the printing service 303. The flow is described in detail below with reference to FIGS. 3 to 14.

In step S1301, the control unit 502 of the printer management service 302 instructs the printing service printer generation unit 504 to log into the printing service 303 by using user information unique to the printer management service 302. The user information unique to the printer management service 302 regards a user, which is registered in the printing service 303 to be used only for registering the image forming apparatus 101 in the printing service 303 and updating the information, and stored in the printing service printer generation unit 504. The unique user information corresponds to a second account.

In step S1302, the printer information registration unit 701 of the printing service 303 processes the log-in request made from the printer management service 302 in step S1301, and checks whether logging-in can be executed based on the user information unique to the printer management service 302. In step S1303, when logging-in is unsuccessful, the control unit 502 of the printer management service 302, which has received a result of logging into the printer service 303 executed in step S1302, proceeds the processing to step S1311, processes an error, and ends the registration.

In step S1304, when the logging into the printing service 303 is successful (YES in step S1303), the control unit 502 of the printer management service 302 determines whether to register a new image forming apparatus 101 in the printing service 303 in step S1204. When the new image forming apparatus 101 is not registered in the printing service 303 (NO in step S1304), the control unit 502 of the printer management service 302 has received the request of sharing the registered image forming apparatus 101, namely, the sharing request, in step S1207.

In step S1305, when the new image forming apparatus 101 is registered in the printing service 303 (YES in step S1304), the control unit 502 gives an instruction to the printing service printer generation unit 504. The control unit 502 then instructs registration of the image forming apparatus 101 in the printing service 303 based on the user information unique to the printer management service 302. The information of the image forming apparatus 101 used for registration in the printing service 303 is the information regarding the printing function usable according to the authority of the User A generated by the printing control unit 402 in step S1203.

In step S1306, the printer information registration unit 701 of the printing service 303, which has received the instruction from the printer management service 302 in step S1305, executes next processing. This processing is for storing, based on the received registration information, the image forming apparatus 101 in the printer information storage unit 702 linked with the unique user of the printer management service 302. In this case, the printer information registration unit 701 issues an SPID to identify the image forming apparatus 101 registered in the printer information storage unit 702, and stores it in linkage. The printer information registration unit 701 returns, as a result of successful registration, the SPID to identify the image forming apparatus 101 to the printer management service 302.

When the registration is unsuccessful (NO in step S1307), the control unit 502 of the printer management service 302, which has received the registration result of the image forming apparatus 101 in the printing service 303 in step S1306, proceeds the processing to step S1311 to process an error, and ends the registration. In step S1308, when the registration of the image forming apparatus in the printing service 303 is successful (YES in step S1307), the control unit 502 of the printer management service 302 designates an SPID to identify the image forming apparatus 101, which has been received from the printing service 303. After the designation, the control unit 502 instructs the information of the image forming apparatus 101 registered while being linked with the unique user information to be shared with the account of the User A in the printing service 303. More specifically, the control unit 502 of the printer management service 302 instructs sharing of the image forming apparatus 101 registered in the printing service 303 by using the user information of the printing service 303 input by the User A and received in step S1213. When requesting sharing, the control unit 502 of the printer management service 302 instructs the sharing in a logging-in state by the account of the unique user information.

In step S1309, the printer information registration unit 701 of the printing service 303, which has received the instruction from the printer management service 302 in step S1308, enables the User A to share the image forming apparatus 101 registered while being linked with the account of the unique user information. In this case, the printer information registration unit 701 executes the processing by using the received user information and an SPID of the printing service 303 input by the User A. When the sharing is unsuccessful (NO in step S1310), the control unit 502 of the printer management service 302, which has received the sharing result of the image forming apparatus 101 in the printing service 303 in step S1309, proceeds the processing to step S1311 to process an error, and ends the registration. When the registration of the image forming apparatus normally ends in step S113, the processing proceeds to step S115. When the sharing is successful (YES in step S1310), as illustrated in FIG. 11A, registration information linked with the account of the unique user information can be used. Thus, even the user corresponding to the first account can use the information of the image forming apparatus registered while being linked with the second account.

The registration of the image forming apparatus 101 having the printing function usable according to the authority of the User A enables the User A to designate only the usable printing function and execute printing. The image forming apparatus 101 is first registered in the printing service 303 by using the unique user information of the printer management service 302. This enables automatic updating of the information of the image forming apparatus 101 registered in the printing service 303 when the configuration of the image forming apparatus is changed. There is no need for each user to individually register the image forming apparatus 101 shared by the plurality of users. Hence, the printing function needs to be changed only for the unique user of the printer management service 302 when the configuration of the image forming apparatus 101 is changed described below. As a result, the information of the image forming apparatus 101 registered in the printing service 303 can be updated without any unnecessary processing in the image forming apparatus 101, the printer management service 302, or the printing service 303, and without any network load.

Referring to FIGS. 1 to 16, processing when there is a certain change in configuration of the image forming apparatus 101 in the content printing system according to the first exemplary embodiment of the present invention is specifically described.

Figure 15:
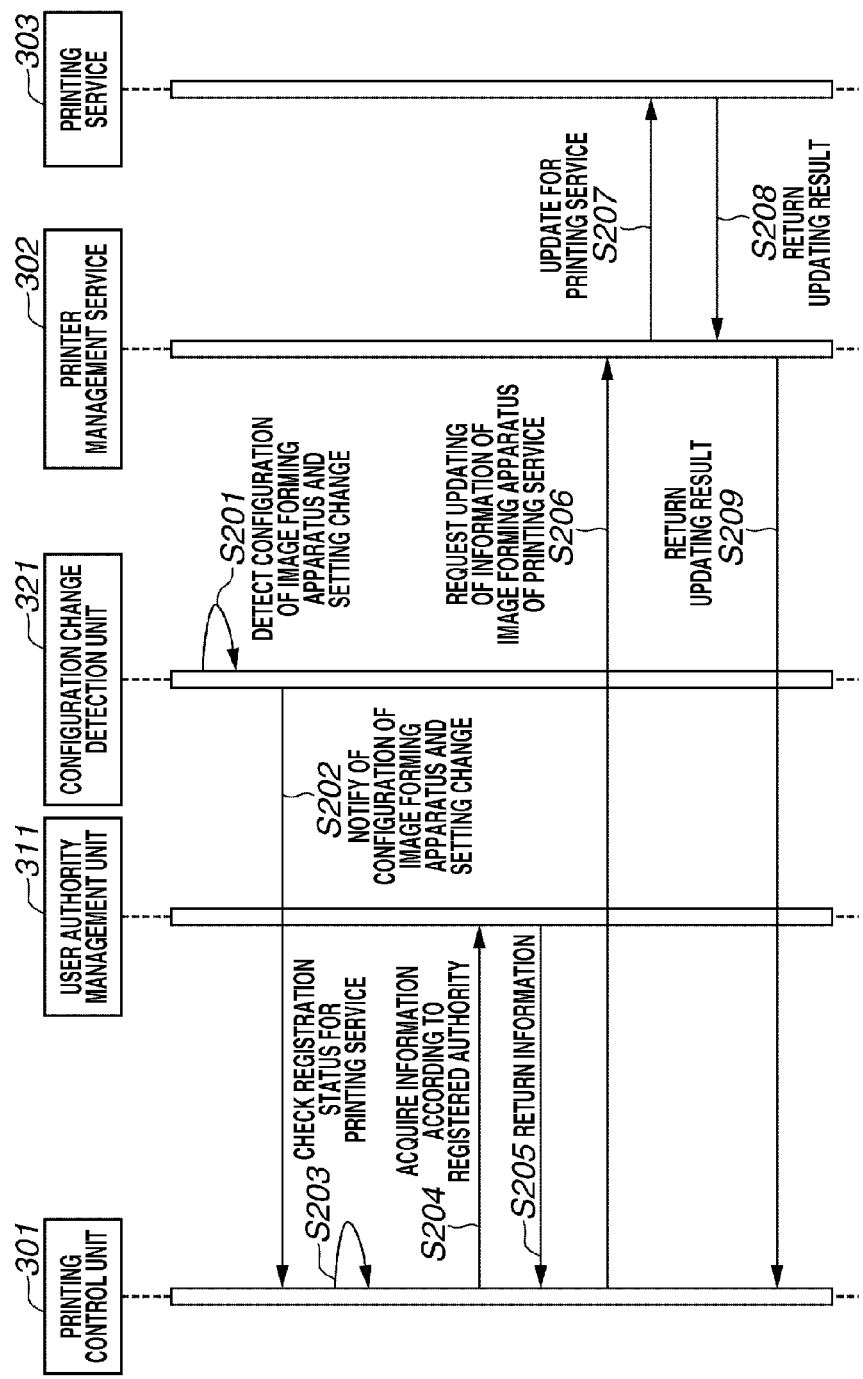
FIG. 15 is a sequence diagram illustrating an outline of a flow of updating the image forming apparatus in the printing service in the content printing system according to the first exemplary embodiment of the present invention.

Having detected a certain change in configuration of the image forming apparatus 101, the configuration change detection unit 321 transmits a changed content to the printing service 303, and the information of the image forming apparatus 101 registered in the printing service 303 is updated. FIG. 15 is a sequence diagram illustrating an outline of an updating flow of the image forming apparatus 101 in the printing service 303. The flow is described below with reference to FIGS. 3 to 15.

In step S201, the configuration change detection unit 321 in the image forming apparatus 101 detects a hardware configuration change of the image forming apparatus 101. More specifically, the configuration change detection unit 421 in the configuration change detection unit 321 detects addition or deletion of hardware components such as a finisher concerning the printing function of the image forming apparatus 101, which affects user's print setting. In step S202, the configuration change detection unit 321, which has detected the configuration change of the image forming apparatus 101 in step S201, notifies the registration unit 403 of the printing control unit 301 of the change.

In step S203, the registration unit 403, which has been notified of the configuration change of the image forming apparatus 101 in step S202, checks whether the image forming apparatus 101 has been registered in the printing service 303. Specifically, as illustrated in FIG. 10B, the registration unit 403 checks the registration state of the image forming apparatus 101 having the printing function usable according to the authority of the user in the printing service 303 to confirm whether the image forming apparatus 101 has been registered. In step S204, after confirmation in step S203 that the image forming apparatus 101 has been registered in the printing service 303, the registration unit 403 executes next processing. As illustrated in FIG. 10B, this processing is for acquiring information to identify a registered user authority based on the registration state in the printing service 303: specifically, a character string such as "AdminUser" or "GeneralUser". Then, the registration unit 403 accesses, by using the acquired information to identify the user authority, the user authority management unit 411 to acquire the printing function of the image forming apparatus 101 usable according to the authority. Thus, latest information regarding the printing function after the configuration change of the image forming apparatus 101 can be acquired.

In step S205, the user authority management unit 411, which has received the acquisition request from the registration unit 403 in step S204, returns the printing function of the image forming apparatus 101 usable according to the authority. In step S206, the printer management service 302 acquires the printing function of the image forming apparatus 101 usable according to the authority, which has been acquired in step S205. In this case, for example, when a finisher is deleted, information to delete information regarding the printing function relating to the finisher is transmitted to the printer management service 302. Then, to update the information registered in the printing service 303, the registration unit 403 transmits registration information containing the printing function of the image forming apparatus 101 usable according to the acquired authority and ID to identify the image forming apparatus 101 to the printer management service 302 to make an updating request.

In step S207, the request reception unit 501 in the printer management service 302 receives the updating request of the image forming apparatus 101 registered in the printing service 303 in step S206. The control unit 502 instructs, according to the received updating request, the printing service printer generation unit 504 to update the information of the image forming apparatus 101 registered in the printing service 303. This step is described in detail below with reference to FIG. 16. In step S208, a result of updating the information of the image forming apparatus 101 in the printing service 303 in step S207 is received. In step S209, the control unit 502, which has received the updating result in step S208, returns the result of updating the information of the image forming apparatus 101 in the printing service 303 to the printing control unit 301.

Figure 16:
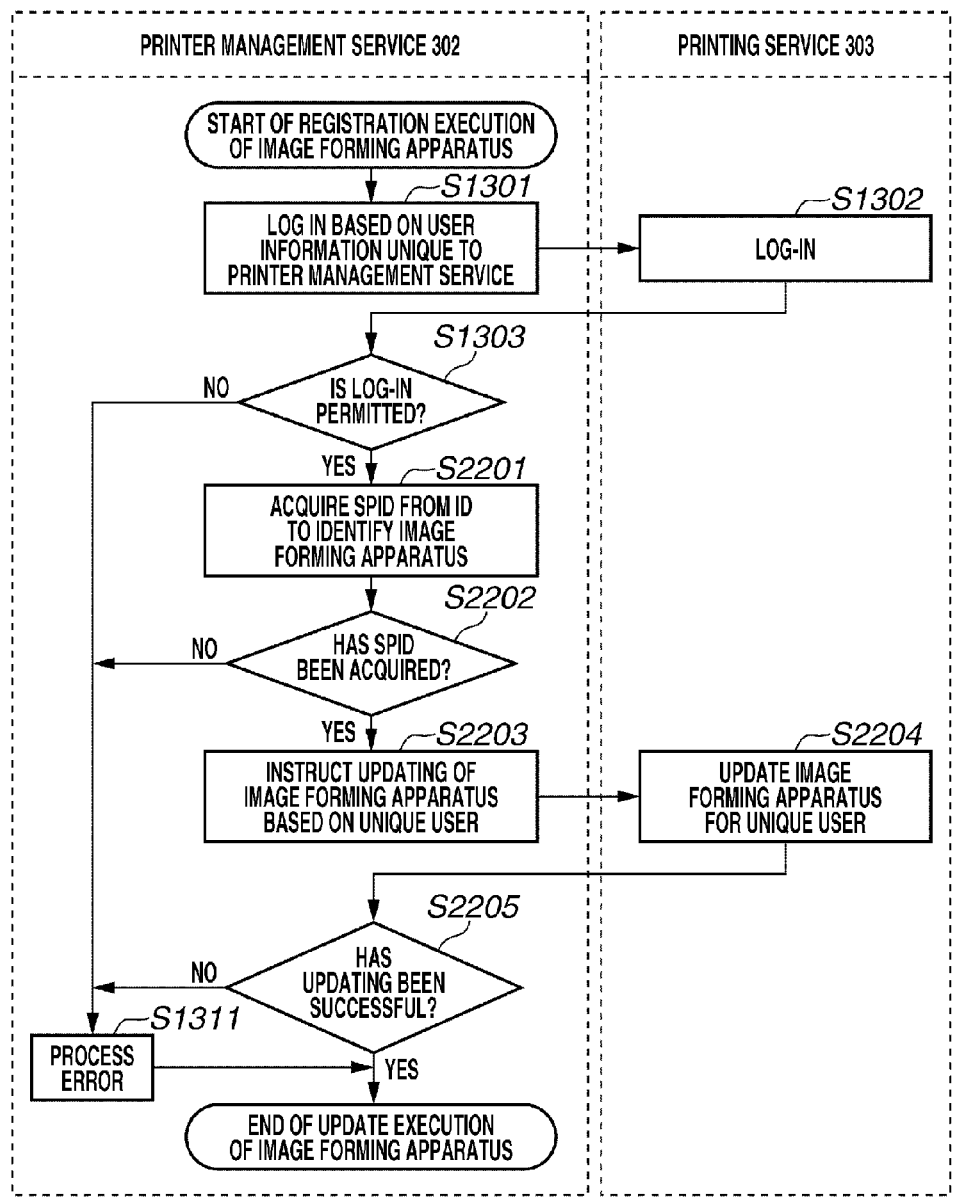
FIG. 16 is a flowchart illustrating a flow of update execution of the image forming apparatus in the printing service in the content printing system according to the first exemplary embodiment of the present invention.

In step S207, the updating request of the image forming apparatus 101 registered in the printing service 303 made in step S206 is received. The control unit 502 of the printer management service 302 updates the information of the image forming apparatus 101 registered in the printing service 303. FIG. 16 is a flowchart illustrating an updating flow of the image forming apparatus in the printing service 303. The flow is described in detail below with reference to FIGS. 3 to 16. In the flowchart of FIG. 16, steps S1301 to S1303 are similar to those of the registration of the image forming apparatus in the printing service 303 illustrated in FIG. 14, and thus description thereof is omitted. In step S2201, the control unit 502 acquires the SPID to identify the image forming apparatus 101 in the printing service 303, which has been stored in the printer information management unit 503. In this case, the control unit 502 acquires the SPID based on the ID to identify the image forming apparatus 101, which has been transmitted from the printing control unit 301 in step S206.

When the SPID to identify the image forming apparatus 101 in the printing service 303 is not acquired (NO in step S2202), the processing proceeds to step S131 to process an error. The updating processing is then ended. In step S2203, when the control unit 502 successfully acquires the SPID (YES in step S2202), the control unit 502 instructs the printing service printer generation unit 504 to update the image forming apparatus 101 registered in the printing service 303. In this case, the control unit 502 designates the unique user information of the printer management service 302, the SPID acquired in step S2202, and the registration information received from the printing control unit 301 in step S206 to instruct updating of the image forming apparatus 101 registered in the printing service 303.

In step S2204, the printer information registration unit 701, which has received the instruction in step S2203, checks the mage forming apparatus 101 registered in the printer information storage unit 702 linked with the second account based on the received SPID. Having confirmed the presence of the image forming apparatus 101, the printer information registration unit 701 updates, based on the received registration information, a content of the image forming apparatus 101 registered in the printer information storage unit 702 linked with the unique user information of the printer management service 302. In step S2205, when the registration is unsuccessful, the control unit 502 of the printer management service 302, which has received the registration result in step S2204, proceeds the processing to step S1311 to process an error, and ends the registration.

Thus, when the configuration of the image forming apparatus 101 is changed, the information of the image forming apparatus registered in the printing service 303 can be updated. The user can, therefore, designate a printing function always in a latest state to execute printing without any bothersome work.

The first exemplary embodiment of the present invention has directed to the case where the addition or deletion of hardware components such as a finisher concerning the printing function of the image forming apparatus 101 is detected. According to the present invention, even when there is a change in printing function usable according to the user authority, similar processing can be employed. For example, having detected a change in setting of a printing function of the image forming apparatus 101 usable according to the user authority "GeneralUser", the user authority management unit 411 in the image forming apparatus 101 notifies the configuration change detection unit 421 of the change. Thus, even when there is a change in printing function usable according to the user authority, the user can designate a printing function always in a latest state to execute printing by executing the updating flow illustrated in FIGS. 15 and 16.

Next, referring to FIGS. 1 to 18, steps of re-registration of an image forming apparatus 101 registered in a printing service 303 when authority of a user is changed in a content printing system according to a second exemplary embodiment of the present invention are specifically described.

Having detected a change in authority of a User A in the image forming apparatus 101, a user authority management unit 311 notifies a configuration change detection unit 321 of the change, transmits a changed content to a printer management service 302, and re-registers the image forming apparatus 101 in the printing service 303.

Figure 17:
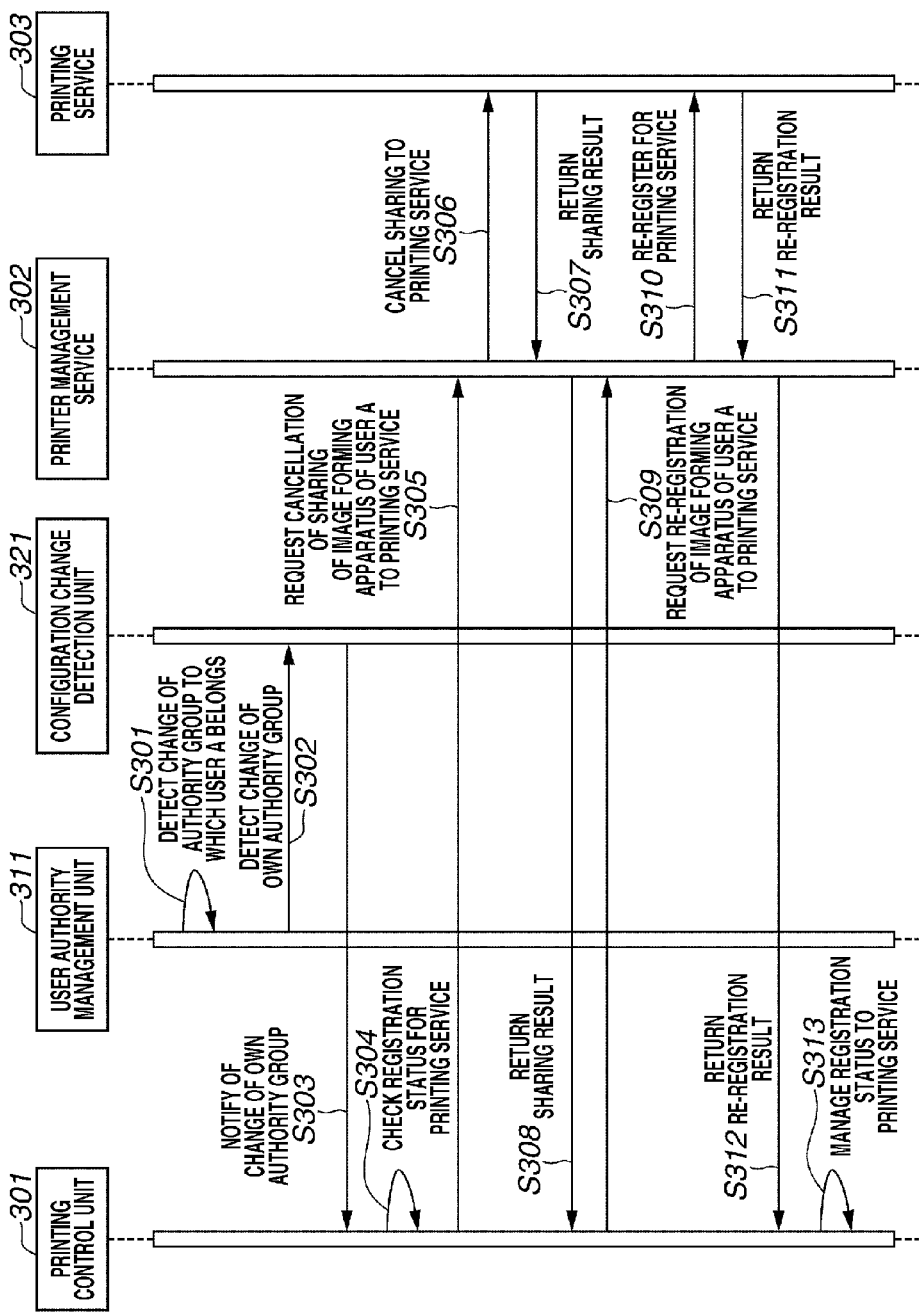
FIG. 17 is a sequence diagram illustrating an outline of a flow of re-registering the image forming apparatus in the printing service when authority of the user is changed in the content printing system according to the first exemplary embodiment of the present invention.

As the change in authority of the User A, for example, a case where authority is changed from "GeneralUser" given by the user authority management unit 311 of the image forming apparatus to the User A to "AdminUser" is presumed. In this case, a printing function of the image forming apparatus 101 usable by the User A is changed, and hence the image forming apparatus 101 usable by the User A must be re-registered in the printing service 303. FIG. 17 is a sequence diagram illustrating an outline of a re-registration flow of the image forming apparatus in the printing service 303 when the authority of the User A is changed. The re-registration flow is described below with reference to FIGS. 3 to 7.

In step S301, the user authority management unit 311 in the image forming apparatus 101 detects a change of authority of the User A. More specifically, a user authority management unit 411 in the user authority management unit 311 detects a change of authority of the User A from "GeneralUser" to "AdminUser". A user change is instructed from the image forming apparatus 101 or a client computer 104. As illustrated in FIGS. 9A and 9B, when user authority is different, a printing function (453) of the image forming apparatus 101 usable according to the user authority is different. When authority of the User A is "GeneralUser", to enable the User A to use the image forming apparatus 101 having a printing function usable according to "AdminUser", re-registration is necessary in the printing service 303.

In step S302, when the change of the authority of the User A to "AdminUser" is detected in step S301, the user authority management unit 411 notifies a configuration change detection unit 321 of the change. In step S303, the configuration change detection unit 321 notifies a registration unit 403 of a printing control unit 301 of the change of the authority of the User A to "AdminUser" notified of from the user authority management unit 311 in step S302. In step S304, the registration unit 403, which has been notified of the change of the authority of the User A in step S303, checks whether the User A shares the image forming apparatus registered in the printing service 303. FIG. 10C illustrates an example where the registration unit 403 in the printing control unit 301 manages a registered state of the image forming apparatus 101 in the printing service 303. The registration unit 403 stores, in linkage, the user authority, the image forming apparatus 101 having a printing function usable according to the user authority, and a list of uses sharing the image forming apparatus 101 registered in the printing service 303. In step S117, the registration unit 403 manages, in linkage, the character string to identify the user authority illustrated in FIG. 10B and whether the image forming apparatus 101 having a printing function usable according to the user authority has been registered in the printing service 303. However, in FIG. 10C, the users sharing the image forming apparatus in the printing service 303 are also managed.

In step S305, after confirmation in step S304 that the User A shares the registered information, the registration unit 403 requests the printer management service 302 to cancel the sharing of the image forming apparatus 101 registered in the printing service 303 by the Use A. In step S306, a request reception unit 501 in the printer management service 302 receives the sharing cancellation request of the image forming apparatus 101 registered in the printing service 303 by the User A made in step S305. In response to the received sharing cancelation request, a control unit 502 instructs a printing service printer generation unit 504 to cancel the sharing, requesting cancelation of the shared state of the image forming apparatus 101 by the User A. A printer management service 302 logs into the printing service 303 based on unique user information of the printer management service 302 to request a cancelation instruction to cancel the sharing of the image forming apparatus 101 by the User A. When the sharing of the image forming apparatus 101 by the User A is canceled in the printing service 303, user information to identify the User A can be held in the printing control unit 301 or the printer management service 302. The user information in the printing service 303 may not be held. For example, before this step is executed, the control unit 502 in the printer management service 302 can give a notification to the User A by a method such as mail, thereby causing the User A to input user information necessary for cancelling the sharing of the image forming apparatus 101.

In step S307, the printing service printer generation unit 504 receives a result of the sharing cancelation of the image forming apparatus 101 registered in the printing service 303 by the User A executed in step S306. In step S308, the control unit 502, which has received the sharing cancelation result in step S307, returns the sharing cancelation result of the image forming apparatus 101 shared by the User A from the printing service 303 to the printing control unit 301. The registration unit 403 in the printing control unit 301 updates the registration information of the image forming apparatus 101 in the printing service 303 according to the user authority illustrated in FIG. 10C, and deletes the User A from a list of users sharing the image forming apparatus in the printing service.

In step S309, to enable use of the image forming apparatus 101 having a printing function according to new authority "AdminUser" of the User A in the printing service, the registration unit 403 requests the printer management unit 302 to re-register the image forming apparatus 101. This step is described in detail below with reference to FIG. 18. In step S310, the printer management service 302, which has received the re-registration request in step S309, registers information of the image forming apparatus 101 reflecting the printing function usable according to current authority of the User A changed in authority in the printing service 303. This step is described in detail below with reference to FIG. 14. In step S311, the printer management service 302 receives a result of the registration of the image forming apparatus 101 in the printing service 303 in step S310. In step S312, the registration unit 403 in the printing control unit 301 receives a result of the registration of the information of the image forming apparatus 102 in the printing service 303, which has been received in step S311. In step S313, the printing control unit 301 checks a success of the registration of the image forming apparatus 101 in the printing service 303, the result of which has been received in step S312. The registration unit 403 stores and manages sharing of the image forming apparatus 101 having the printing function according to the new authority "AdminUser" of the User A in the printing service 303.

In step S309, to enable use of the image forming apparatus 101 having the printing function according to the new authority "AdminUser" of the User A in the printing service 303, the registration unit 403 requests the printer management service 302 to re-register the image forming apparatus 101.

Figure 18:
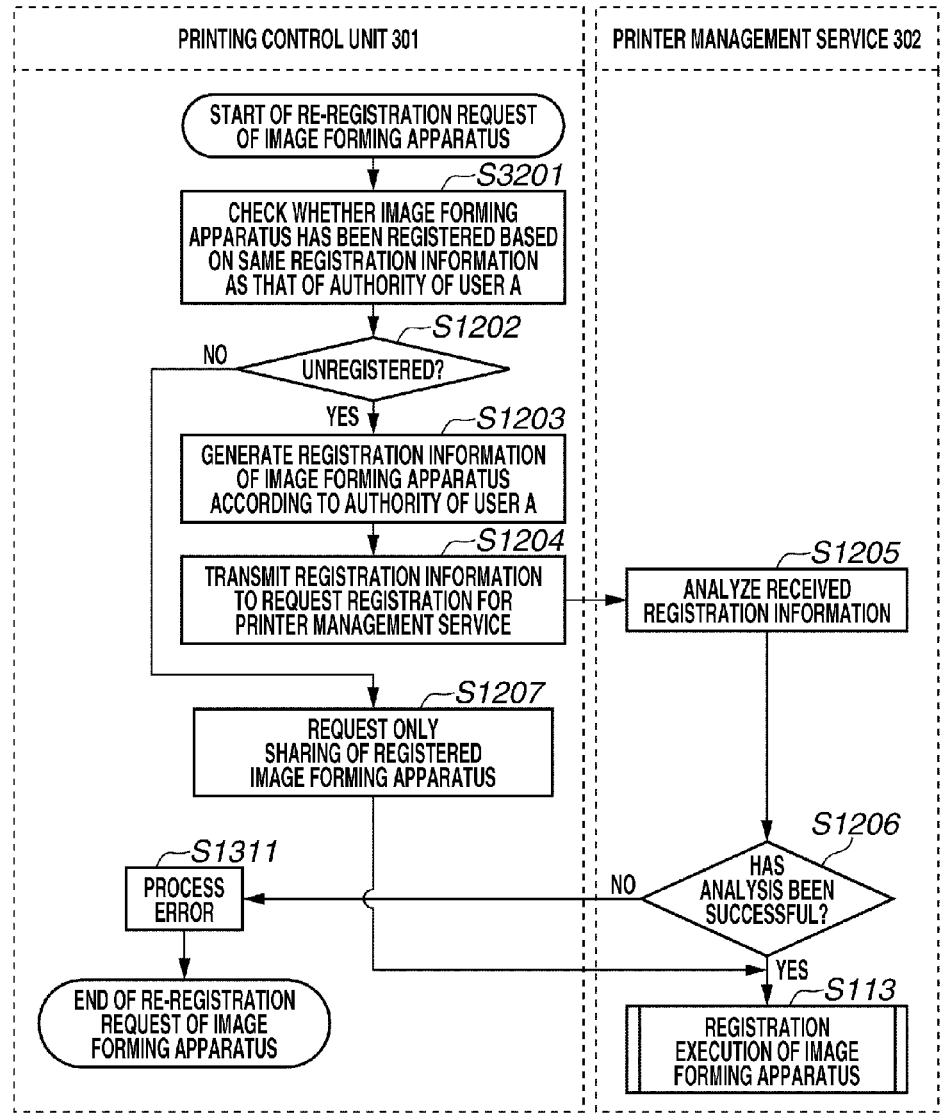
FIG. 18 is a flowchart illustrating a flow of re-registration requesting of the image forming apparatus to the printer management service in the content printing system according to the first exemplary embodiment of the present invention.

FIG. 18 is a flowchart illustrating a flow of re-registration of the image forming apparatus in the printer management service. Referring to FIGS. 3 to 18, this re-registration flow is described. In step S3201, the registration unit 403 of the printing control unit 301 is notified of the change of the authority of the User A to "AdminUser" executed in step S303. The registration unit 403 then checks whether information of the image forming apparatus 101 having a printing function usable according to the authority "AdminUser" has been registered in the printing service 303. As described above, the registration unit 403 in the printing control unit 301 manages the registration state of the image forming apparatus 101 in the printing service 303 as illustrated in FIG. 10B or FIG. 10C.

Steps S1202 to S1207 are then executed. These steps are similar to those of the registration of the image forming apparatus in the printer management service 302 illustrated in FIG. 13, and thus description thereof is omitted. The processing flow changes depending on determination in step S3201 as to whether the image forming apparatus 101 having the printing function usable according to the authority "AdminUser" has been registered in the printing service 303. After all the processes have normally ended, the control unit 502 of the printer management service 302 ends preprocessing for registering the image forming apparatus 101 in the printing service 303, and executes the re-registration of the image forming apparatus of step S310.

In step S1205, the registration unit 403 of the printing control unit 301 generates registration information of the image forming apparatus 101 having the printing function usable according to the authority "AdminUser". The registration unit 403 transmits the registration information to the printer management service 302. The control unit 502 of the printer management service 302 analyzes a content of the registration information. When the content of the registration information is not normal as a result of the analysis (NO in step S1206), the processing proceeds to step S1311 to process an error. The re-registration of the image forming apparatus 101 is then ended.

In steps S310 and S311, the printer management service 302 requested by the printing control unit 301 in step S309 registers information of the image forming apparatus 101 reflecting the printing function usable according to the authority of the User A in the printing service 303. FIG. 14 is the flowchart illustrating the registration flow of the image forming apparatus in the printing service 303 as described above, and the re-registration is similar. Referring to FIGS. 3 to 14, only different steps are described in detail below.

Steps S1301 to S1307 and steps S1309 to S1311 are similar to those of the registration of the image forming apparatus in the printing service 303 described above, and thus description thereof is omitted. A step of the re-registration different from that of the registration is S1308. In step S1308, when the registration of the image forming apparatus 101 in the printing service 303 is successful (YES in step S1307), next processing is executed. The control unit 502 of the printer management unit 302 designates an SPID to identify the image forming apparatus 101 in the printing service 303, and instructs the User A to share the image forming apparatus 101. The image forming apparatus 101 shared by the User A is the image forming apparatus 101 having the printing function usable according to the authority "AdminUser". In this case, for user information designated when the image forming apparatus 101 is shared by the User A in the printing service 303, information stored in the printing control unit 301 or the printer management service 302 can be used. The printing control unit 301 or the printer management service 302 may not store any user information in the printing service 303. For example, before this step is executed, the control unit 502 can give a notification to the User A by a method such as mail, thereby causing the User A to input user information necessary for sharing the image forming apparatus 101.

Thus, even when the authority of the user registered in the image forming apparatus 101 is changed, the image forming apparatus linked with the user registered in the printing service 303 can be automatically re-registered. The user can therefore designate a printing function always in a latest state to execute printing without any bothersome work. According to the exemplary embodiment of the present invention, the printing control unit 301, the user authority management unit 311, and the configuration change detection unit 312 are located in the image forming apparatus 101. However, these software components can be arranged in the printing management server 102. In such a case, a part of the processing illustrated in FIG. 12 is changed. After authentication of logging into the image forming apparatus via the web browser, the user accesses the printing control unit 301 based on the authenticated information.

According to the first and second exemplary embodiments, the printing control unit 301, the user authority management unit 311, and the configuration change detection unit 312 are included in the image forming apparatus 101. However, these software components can all or partially be arranged in the printing management server 102. In such a case, all or some of the abovementioned processes are carried out in the printing management server 102. For example, the registration information illustrated in FIGS. 10B and 10C are managed in the printing management server 102. As illustrated in FIG. 12, in step S102, the web browser 304 makes the UI screen request to the printing control unit 301. However, the web browser 304 can make a request not to the printing control unit 301 but to authentication control software present in the image forming apparatus 101. After the successful logging-in, a UI screen request is made to the printing control unit 301 from the authentication control software. The notification of the configuration change and the notification of the user authority change are periodically transmitted from the image forming apparatus 101 to the printing management server 102. The configuration change detection unit 321 or the user authority management unit 311 in the printing management server 102, which has received the notifications, starts the abovementioned processing.

In addition, the functions of the printer management service 302 can be shifted to the image forming apparatus 101. In that case, the processing operations described in the first and second exemplary embodiments are performed by the image forming apparatus and the printing server group 103. The unique user information corresponds to an account of the image forming apparatus 101.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. A print relay system capable of communicating with a printing service system managed by a vendor that releases specifications for data communication with an image forming apparatus, the print relay system comprising:
    a determination unit configured to determine, when a request for registration of the image forming apparatus used by a user is acquired in a registered state of a first account that is an account of the user using the image forming apparatus and a second account that is an account of the print relay system in the printing service system, whether the second account and information regarding a printing function of the image forming apparatus have been registered in association with each other in the printing service system;
    an instruction unit configured to instruct, when the determination unit determines that the second account and the information have not been registered in association with each other, registration of the second account and the information regarding the printing function in association with each other; and a requesting unit configured to request, after the instruction of the instruction unit or when the determination unit determines that the second account and the information have been registered in association with each other, sharing to the printing service system to enable even the user of the first account to use the information regarding the printing function registered in association with the second account; and a cancellation instruction unit configured to instruct, when the authority of the user to the image forming apparatus is changed, the printing service system to cancel a state where the first account shares the information regarding the printing function, wherein the determination unit determines, when an authority of the user to the image forming apparatus is changed, whether information regarding the printing function corresponding to the changed authority has been registered in association with the second account, wherein the instruction unit instructs, when the determination unit determines that the information regarding the printing function of the image forming apparatus corresponding to the changed authority has not been registered, registration of the information regarding the printing function of the image forming apparatus corresponding to the changed authority in association with the second account, wherein the requesting unit requests, after the instruction of the instruction unit to register the information regarding the printing function of the image forming apparatus corresponding to the changed authority in association with the second account, or when the determination unit determines that the information regarding the printing function of the image forming apparatus corresponding to the changed authority has been registered, sharing to the printing service system to enable even the user of the changed authority to use the information regarding the printing function of the image forming apparatus corresponding to the changed authority registered in association with the second account, and wherein the instruction unit gives the instruction after the cancellation instruction unit cancels the state where the first account shares the information regarding the printing function.

2. The print relay system according to claim 1, wherein the printing service system provides a print setting screen to a user based on the information regarding the printing function stored in association with the account of the user, wherein the image forming apparatus restricts use according to an authority to the image forming apparatus;

wherein the determination unit acquires an authority of the user to the image forming apparatus, and determines whether information regarding the printing function based on the acquired authority has been registered in association with the second account in the printing service system, wherein the instruction unit instructs, when the determination unit determines that the information has not been registered, registration of the information regarding the printing function based on the acquired authority in association with the second account, and wherein the requesting unit requests, when the determination unit determines that the information has been registered or after the instruction of the instruction unit, sharing to the printing service system to enable even the user of the first account to use the information regarding the printing function registered in association with the second account.

3. The print relay system according to claim 1, further comprising a transmission unit configured to transmit, when a change in configuration of the image forming apparatus necessitates updating of the information regarding the printing function registered in association with the second account, information necessary for updating the information regarding the printing function of the image forming apparatus to the printing service system.

4. An image forming apparatus for transmitting data to a print relay system capable of communicating with a printing service system managed by a vendor that releases specifications for data communication with the image forming apparatus, the image forming apparatus comprising:

a determination unit configured to determine, when registration of the image forming apparatus used by a user is instructed in a registered state of a first account that is an account of the user using the image forming apparatus and a second account that is an account of the print relay system in the printing service system, whether the second account and information regarding a printing function of the image forming apparatus have been registered in association with each other in the printing service system;

an instruction unit configured to instruct, when the determination unit determines that the second account and the information have not been registered in association with each other, the print relay system to register the second account and the information regarding the printing function in association with each other;

a requesting unit configured to request, when the determination unit determines that the second account and the information have been registered in association with each other, sharing to the printing service system to enable even the user of the first account to use the information regarding the printing function registered in association with the second account; and a cancellation instruction unit configured to instruct, when the authority of the user to the image forming apparatus is changed, the printing service system to cancel a state where the first account shares the information regarding the printing function, wherein the determination unit determines, when an authority of the user to the image forming apparatus is changed, whether information regarding the printing function corresponding to the changed authority has been registered in association with the second account, wherein the instruction unit instructs, when the determination unit determines that the information regarding the printing function of the image forming apparatus corresponding to the changed authority has not been registered, registration of the information regarding the printing function of the image forming apparatus corresponding to the changed authority in association with the second account, wherein the requesting unit requests, after the instruction of the instruction unit to register the information regarding the printing function of the image forming apparatus corresponding to the changed authority in association with the second account, or when the determination unit determines that the information regarding the printing function of the image forming apparatus corresponding to the changed authority has been registered, sharing to the printing service system to enable even the user of the changed authority to use the information regarding the printing function of the image forming apparatus corresponding to the changed authority registered in association with the second account, and wherein the instruction unit gives the instruction to the print relay system after the cancellation instruction unit cancels the state where the first account shares the information regarding the printing function.

5. A method for controlling a system including an image forming apparatus and a print relay system capable of communicating with a printing service system managed by a vendor that releases specifications for data communication with the image forming apparatus, the method comprising:

determining, when a request for registration of the image forming apparatus used by a user is acquired in a registered state of a first account that is an account of the user using the image forming apparatus and a second account that is an account of the print relay system in the printing service system, whether the second account and information regarding a printing function of the image forming apparatus have been registered in association with each other in the printing service system;

instructing, when it is determined that the second account and the information have not been registered in association with each other, the print relay system to register the second account and the information regarding the printing function in association with each other;

requesting, when it is determined that the second account and the information have been registered in association with each other, sharing to the printing service system to enable even the user of the first account to use the information regarding the printing function registered in association with the second account; and instructing, when the authority of the user to the image forming apparatus is changed, the printing service system to cancel a state where the first account shares the information regarding the printing function, wherein the determining determines, when an authority of the user to the image forming apparatus is changed, whether information regarding the printing function corresponding to the changed authority has been registered in association with the second account, wherein the instructing of the print relay system instructs, when the determining determines that the information regarding the printing function of the image forming apparatus corresponding to the changed authority has not been registered, registration of the information regarding the printing function of the image forming apparatus corresponding to the changed authority in association with the second account, wherein the requesting requests, after the instruction to register the information regarding the printing function of the image forming apparatus corresponding to the changed authority in association with the second account, or when the determination unit determines that the information regarding the printing function of the image forming apparatus corresponding to the changed authority has been registered, sharing to the printing service system to enable even the user of the changed authority to use the information regarding the printing function of the image forming apparatus corresponding to the changed authority registered in association with the second account, and wherein the instruction to the print relay system to register is given after canceling the state where the first account shares the information regarding the printing function.

6. A non-transitory storage medium storing a program for controlling an image forming apparatus for transmitting data to a print relay system capable of communicating with a printing service system managed by a vendor that releases specifications for data communication with the image forming apparatus, the program comprising:

determining, when registration of the image forming apparatus used by a user is instructed in a registered state of a first account that is an account of the user using the image forming apparatus and a second account that is an account of the print relay system in the printing service system, whether the second account and information regarding a printing function of the image forming apparatus have been registered in association with each other in the printing service system;

instructing, when it is determined that the second account and the information have not been registered in association with each other, the print relay system to register the second account and the information regarding the printing function in association with each other;

requesting, when it is determined that the second account and the information have been registered in association with each other, sharing to the printing service system to enable even the user of the first account to use the information regarding the printing function registered in association with the second account; and instructing, when the authority of the user to the image forming apparatus is changed, the printing service system to cancel a state where the first account shares the information regarding the printing function, wherein the determining determines, when an authority of the user to the image forming apparatus is changed, whether information regarding the printing function corresponding to the changed authority has been registered in association with the second account, wherein the instructing of the print relay system instructs, when the determining determines that the information regarding the printing function of the image forming apparatus corresponding to the changed authority has not been registered, registration of the information regarding the printing function of the image forming apparatus corresponding to the changed authority in association with the second account, wherein the requesting requests, after the instruction of the instruction unit to register the information regarding the printing function of the image forming apparatus corresponding to the changed authority in association with the second account, or when the determination unit determines that the information regarding the printing function of the image forming apparatus corresponding to the changed authority has been registered, sharing to the printing service system to enable even the user of the changed authority to use the information regarding the printing function of the image forming apparatus corresponding to the changed authority registered in association with the second account, and wherein the instructing of the printing service gives the instruction after canceling the state where the first account shares the information regarding the printing function.

7. An apparatus capable of communicating with a printing service system for providing a print setting screen generated based on registered registration information to a user corresponding to an account associated with the registration information, generating a print job based on information input by the user via the print setting screen, and transmitting the generated print job to a designated destination, the apparatus comprising:
- a determination unit configured to determine, when a request for registration of printer information of a printer that outputs the print job is received, whether the printer information has been registered in the printing service system;
- a registration unit configured to register, when the determination unit determines that the printer information has not been registered, a second account corresponding to the apparatus and the printer information in association with each other, request sharing to the printing service system to enable a first account corresponding to the user who has requested the registration to share the printer information, and when the determination unit determines that the printer information has been registered, without registering the first account and the printer information in association with each other, request sharing to the printing service system to enable the first account to share the printer information registered in association with the second account; and
- a cancellation instruction unit configured to instruct, when the authority of the user to the image forming apparatus is changed, the printing service system to cancel a state where the first account shares the information regarding the printing function,
- wherein the determination unit determines, when an authority of the user to the image forming apparatus is changed, whether information regarding the printing function corresponding to the changed authority has been registered in association with the second account,
- wherein the registration unit instructs, when the determination unit determines that the information regarding the printing function of the image forming apparatus corresponding to the changed authority has not been registered, registration of the information regarding the printing function of the image forming apparatus corresponding to the changed authority in association with the second account,
- wherein the registration unit requests, after the instruction to register the information regarding the printing function of the image forming apparatus corresponding to the changed authority in association with the second account, or when the determination unit determines that the information regarding the printing function of the image forming apparatus corresponding to the changed authority has been registered, sharing to the printing service system to enable even the user of the changed authority to use the information regarding the printing function of the image forming apparatus corresponding to the changed authority registered in association with the second account, and
- wherein the registration unit gives the instruction after the cancellation instruction unit cancels the state where the first account shares the information regarding the printing function.

8. A printing service system managed by a vendor that releases specifications for transmitting print data to an image forming apparatus, the printing service system comprising:
- a storage unit configured to store, when a request for registration of the image forming apparatus is received, registration information regarding a printing function of the image forming apparatus and a first user account in the printing service system in association with each other;
- a reception unit configured to receive a sharing instruction to share and use the registration information with a second user account in the printing service system from a terminal that has logged into the printing service system based on the first user account; and
- a transmission unit configured to transmit, when the sharing is instructed at the time of reception of a printing instruction from a terminal that has logged into the printing service system based on the second user account, a print setting screen generated based on the registration information stored in association with the first user account to the terminal that has logged into the printing service system based on the second user account; and
- a cancellation instruction unit configured to instruct, when the authority of the user to the image forming apparatus is changed, the printing service system to cancel a state where the first account shares the information regarding the printing function,
- wherein the determination unit determines, when an authority of the user to the image forming apparatus is changed, whether information regarding the printing function corresponding to the changed authority has been registered in association with the second account,
- wherein the printing service system instructs, when the determination unit determines that the information regarding the printing function of the image forming apparatus corresponding to the changed authority has not been registered, registration of the information regarding the printing function of the image forming apparatus corresponding to the changed authority in association with the second account,
- wherein the printing service system requests, after the instruction to register the information regarding the printing function of the image forming apparatus corresponding to the changed authority in association with the second account, or when the determination unit determines that the information regarding the printing function of the image forming apparatus corresponding to the changed authority has been registered, sharing to the printing service system to enable even the user of the changed authority to use the information regarding the printing function of the image forming apparatus corresponding to the changed authority registered in association with the second account, and
- wherein the printing service system gives the instruction after the cancellation instruction unit cancels the state where the first account shares the information regarding the printing function.

* * * * *